(12) United States Patent
Lo

(10) Patent No.: US 11,855,817 B2
(45) Date of Patent: *Dec. 26, 2023

(54) WIRED COMMUNICATION SYSTEM INCLUDING ASYMMETRICAL PHYSICAL LAYER DEVICES

(71) Applicant: Axonne, Inc., Sunnyvale, CA (US)

(72) Inventor: William Lo, Cupertino, CA (US)

(73) Assignee: Axonne, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,635

(22) Filed: Nov. 1, 2022

(65) Prior Publication Data

US 2023/0047951 A1 Feb. 16, 2023

Related U.S. Application Data

(63) Continuation of application No. 17/371,031, filed on Jul. 8, 2021, now Pat. No. 11,522,739, which is a continuation of application No. 17/035,593, filed on Sep. 28, 2020, now Pat. No. 11,070,409.

(60) Provisional application No. 62/907,039, filed on Sep. 27, 2019.

(51) Int. Cl.
| | |
|---|---|
| H04L 27/02 | (2006.01) |
| H04B 3/20 | (2006.01) |
| H04B 3/50 | (2006.01) |
| H04B 1/04 | (2006.01) |
| H04L 1/00 | (2006.01) |
| H04L 7/02 | (2006.01) |
| H04B 1/16 | (2006.01) |

(52) U.S. Cl.
CPC .............. *H04L 27/02* (2013.01); *H04B 1/04* (2013.01); *H04B 1/16* (2013.01); *H04B 3/20* (2013.01); *H04B 3/50* (2013.01); *H04L 1/0041* (2013.01); *H04L 1/0045* (2013.01); *H04L 1/0059* (2013.01); *H04L 7/02* (2013.01)

(58) Field of Classification Search
CPC ..... H04L 27/02; H04L 1/0041; H04L 1/0045; H04L 1/0059; H04L 7/02; H04B 1/04; H04B 1/16; H04B 3/20; H04B 3/50
See application file for complete search history.

(56) References Cited

U.S. PATENT DOCUMENTS

| | | | | |
|---|---|---|---|---|
| 4,686,703 | A * | 8/1987 | Bruno | H04L 5/1423 370/290 |
| 6,535,308 | B1 | 3/2003 | BuAbbud et al. | |
| 8,081,625 | B2 | 12/2011 | Powell et al. | |
| 8,964,555 | B1 | 2/2015 | Miller | |
| 9,267,984 | B1 * | 2/2016 | Barkan | G01R 31/28 |
| 9,442,880 | B2 * | 9/2016 | Sixt | H04L 12/40078 |

(Continued)

*Primary Examiner* — Freshteh N Aghdam

(57) ABSTRACT

A first physical layer device includes a first transmitter and a first receiver. The first transmitter transmits first data to a second physical layer device over a medium at a first line rate during a first transmit period. The first receiver is configured to not receive data during the first transmit period and an echo reflection period occurring after the first transmit period. The echo reflection period is based on a length of the medium between the first physical layer device and the second physical layer device. The first receiver is configured to, after the echo reflection period, receive second data from the second physical layer device over the medium at a second line rate that is less than the first line rate.

20 Claims, 25 Drawing Sheets

(56) References Cited

U.S. PATENT DOCUMENTS

| | | |
|---|---|---|
| 10,027,514 B2 * | 7/2018 | Zwart ................ H04L 25/0276 |
| 10,190,862 B2 * | 1/2019 | Dai ........................ G01B 7/026 |
| 2004/0247022 A1 * | 12/2004 | Raghavan ................ H04B 3/32 |
| | | 375/219 |
| 2005/0281366 A1 | 12/2005 | Shachar et al. |
| 2011/0007664 A1 | 1/2011 | Diab et al. |
| 2013/0148503 A1 | 6/2013 | Hutchinson et al. |
| 2013/0163614 A1 | 6/2013 | Diab et al. |

* cited by examiner

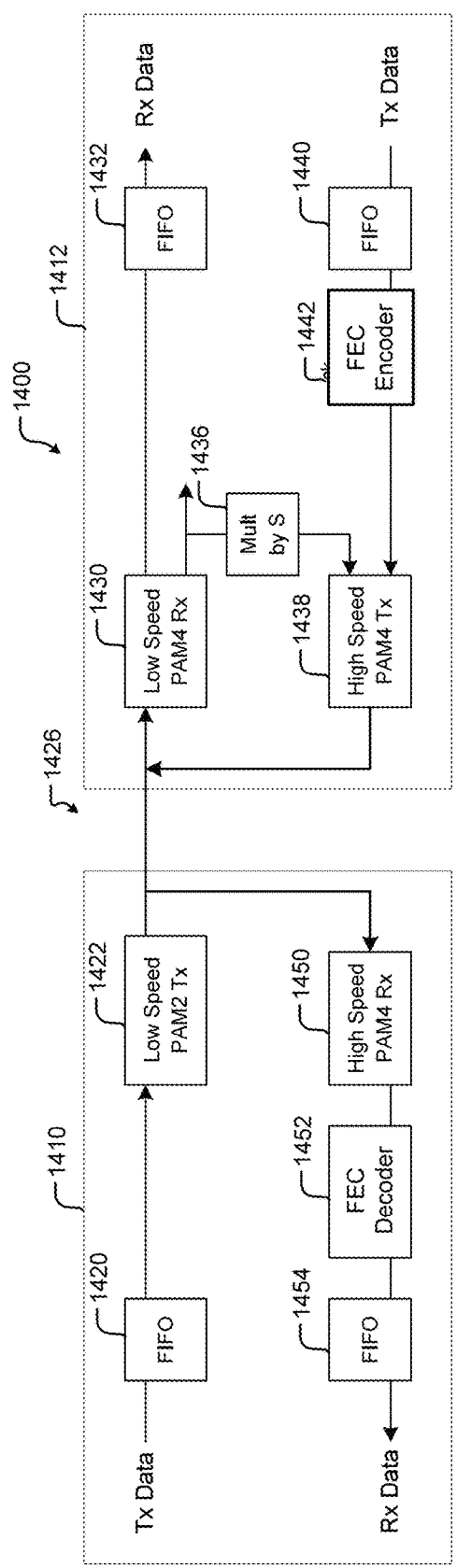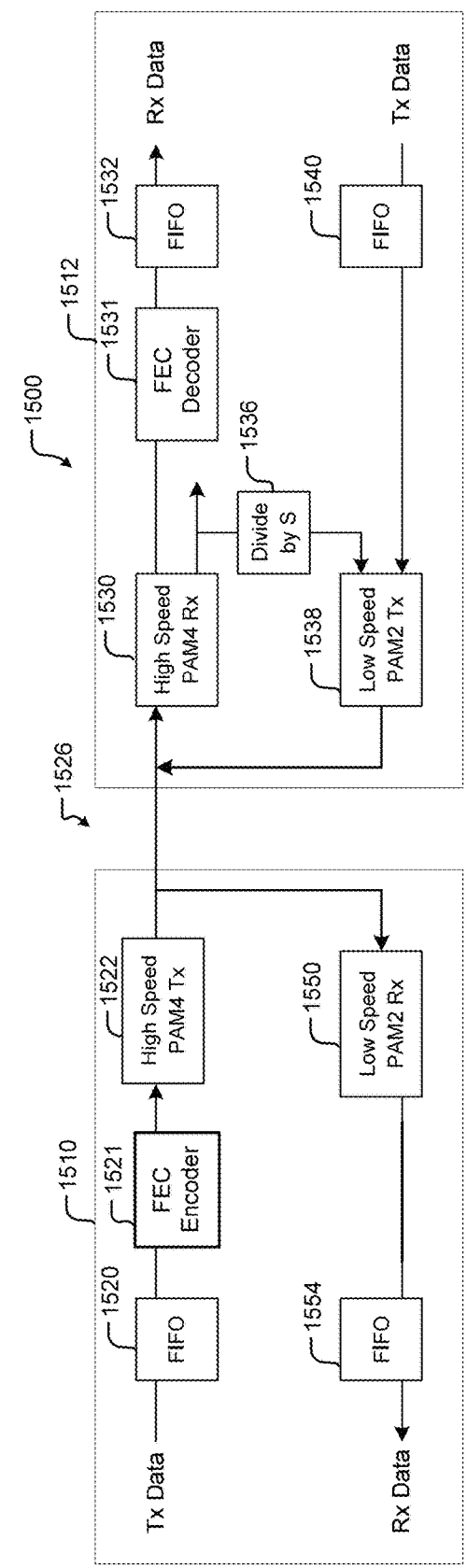

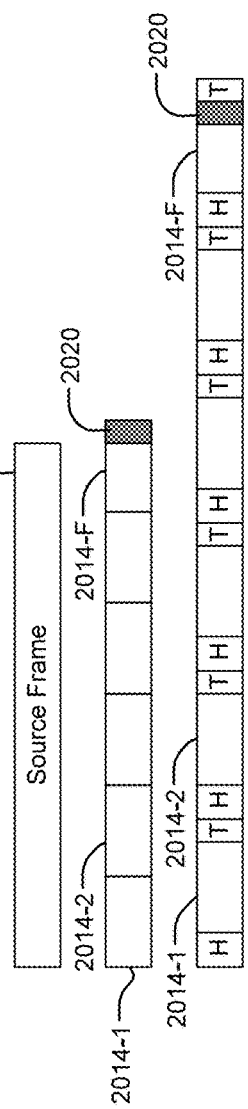
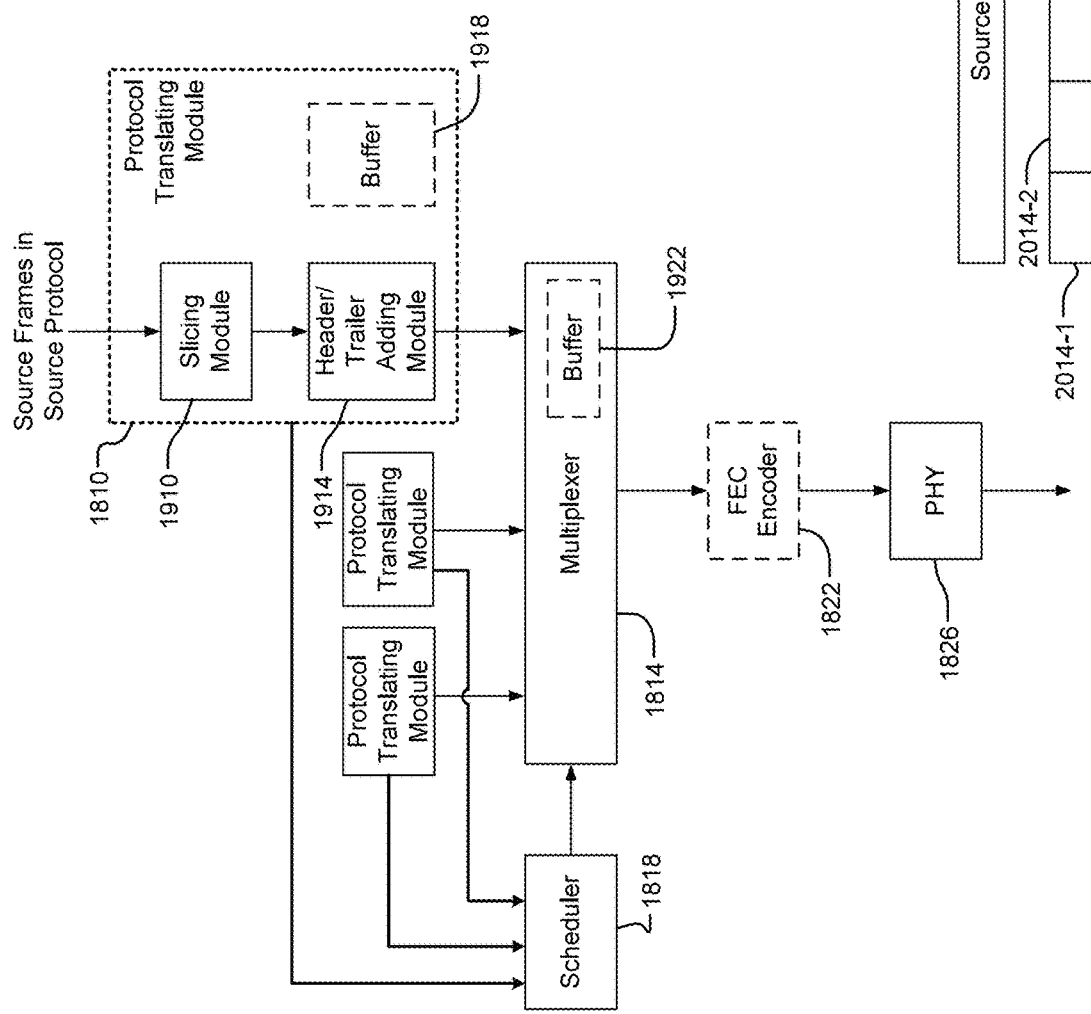
FIG. 19
FIG. 20

| Downstream Line Rate | Upstream Line Rate | FEC | Downstream Data Rate (Mbit/s) | Upstream Data Rate (Mbit/s) | td (ns) | tu (ns) | te (ns) | tc (ns) |
|---|---|---|---|---|---|---|---|---|
| 4000 | 2000 | No | 3600 | 120 | 11664 | 864 | 272 | 12800 |
| 8000 | 2000 | No | 7200 | 120 | 11664 | 864 | 272 | 12800 |
| 12000 | 4000 | Yes | 10000 | 120 | 12150 | 432 | 218 | 12800 |
| 16000 | 4000 | Yes | 13200 | 120 | 12028.5 | 432 | 339.5 | 12800 |

| Downstream Line Rate | Upstream Line Rate | FEC | Downstream Data Rate (Mbit/s) | Upstream Data Rate (Mbit/s) | Downstream 640 Byte Frames/Cycle | Upstream 64 Byte Frames/Cycle | Dead Time Down stream bits | Cycle time (ns) |
|---|---|---|---|---|---|---|---|---|
| 4000 | 2000 | No | 3600 | 120 | 9 | 3 | 1088 | 12800 |
| 8000 | 2000 | No | 7200 | 120 | 18 | 3 | 2176 | 12800 |
| 12000 | 4000 | Yes | 10000 | 120 | 25 | 3 | 2616 | 12800 |
| 16000 | 4000 | Yes | 13200 | 120 | 33 | 3 | 5432 | 12800 |

| L[9:0] | Description |
|---|---|
| 0x000 to 0x27F | Long Frame - L[9:0] set to length where length is 0 to 639 bytes |
| 0x280 to 0x2BF | Medium Frame - L[5:0] set to length where length is 0 to 63 bytes |
| 0x2C0 to 0x2CF | Short Frame - L[3:0] set to length where length is 0 to 15 bytes |
| 0x2D0 | Long Frame - length is 640 bytes |
| 0x2D1 | Medium Frame - length is 64 bytes |
| 0x2D2 | Short Frame - length is 16 bytes |
| 0x2D3 | Short Frame - OAM Frame |
| 0x2D4 to 0x2FE | Reserved for future special frames |
| 0x2FF | Short Frame - Ordered set |
| 0x300 to 0x3FF | Reserved for future use |

FIG. 25

| Downstream | | | | | | | Upstream | | | | | | |
|---|---|---|---|---|---|---|---|---|---|---|---|---|---|
| Raw Bit Rate | Line Speed | PAM level | Frame Size | Frames/ burst | Training Header | Trailer | Raw Bit Rate | Line Speed | PAM level | Frame Size | Frames/ burst | Training Header | Trailer | Total quiet period |
| Mb/s | Mbaud | | Bytes | Frames | Symbols | Symbols | Mb/s | Mbaud | | Bytes | Frames | Symbols | Symbols | ns |
| 2000 | 2000 | 2 | 216 | 15 | 32 | 16 | 2000 | 2000 | 2 | 54 | 2 | 32 | 16 | 208 |
| 4000 | 4000 | 2 | 216 | 30 | 64 | 16 | 4000 | 4000 | 2 | 54 | 4 | 64 | 16 | 216 |
| 8000 | 8000 | 2 | 216 | 60 | 128 | 16 | 4000 | 4000 | 2 | 54 | 4 | 64 | 16 | 218 |
| 8000 | 8000 | 2 | 240 | 54 | 128 | 16 | 4000 | 4000 | 2 | 54 | 4 | 64 | 16 | 218 |
| 12000 | 6000 | 4 | 240 | 81 | 96 | 16 | 4000 | 4000 | 2 | 54 | 4 | 64 | 16 | 217.33 |
| 16000 | 8000 | 4 | 240 | 108 | 128 | 16 | 4000 | 4000 | 2 | 54 | 4 | 64 | 16 | 218 |

FIG. 28

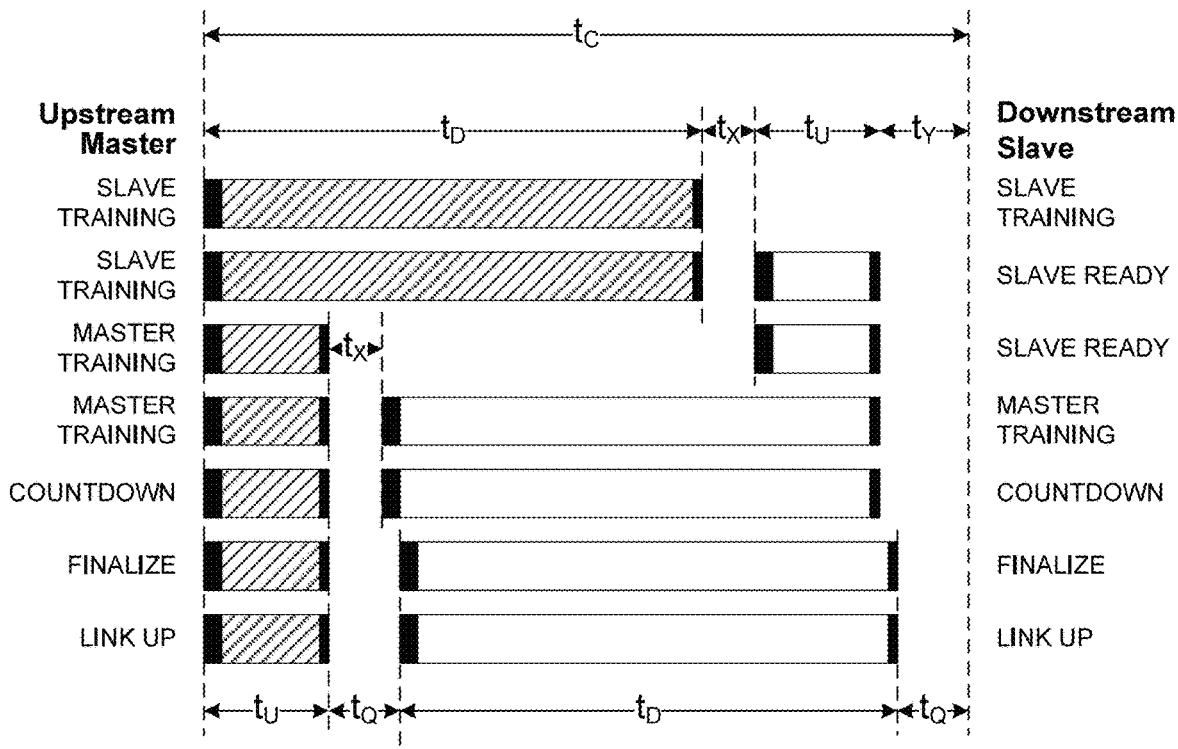
FIG. 29
FIG. 30
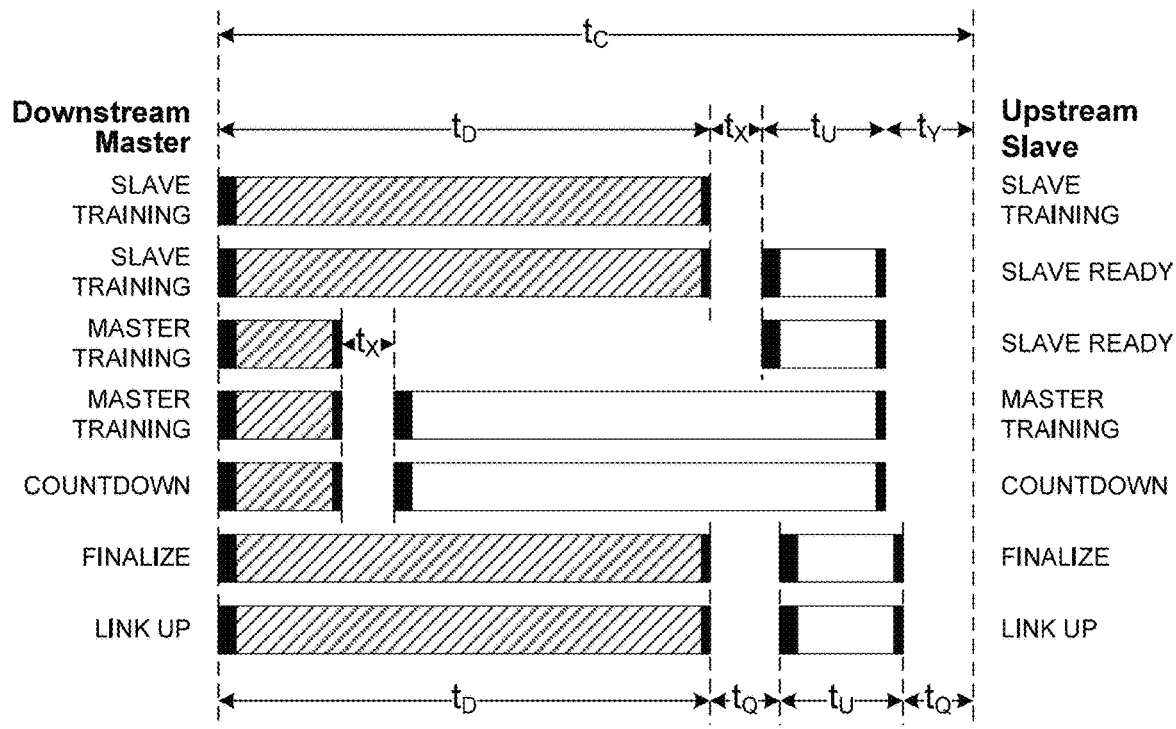

| Byte | Definition |
|---|---|
| 0 to 35 | All 0's |
| 36 | 0xED |
| 37 | 0xC4 |
| 38 | Bit 0 - Always set to 1<br>Bit 1 - Receiver Locked, 0 = not locked, 1 = locked<br>Bit 2 - Leader/Follower, 0 = follower, 1 = leader<br>Bits 3 to 7 - Reserved set to 0s |
| 39 | Frame Count |
| 40 | Cycle Count LSB |
| 41 | Cycle Count MSB |
| 42 | Countdown cycle LSB |
| 43 | Countdown cycle MSB |
| 44 | Quiet time increment |
| 45 to 51 | Reserved. Set to 0s |
| 52, 53 | Parity |

FIG. 32

| Line Speed | Direction | Frame Size | Frames / burst |
|---|---|---|---|
| Mbaud | | Bytes | Frames |
| 2000 | Downstream | 54 | 60 |
| 4000 | Downstream | 54 | 120 |
| 6000 | Downstream | 54 | 180 |
| 8000 | Downstream | 54 | 240 |
| 2000 | Upstream | 54 | 2 |
| 4000 | Upstream | 54 | 4 |

FIG. 33

| Byte | Definition |
|---|---|
| 0 | Bit 0 - Always set to 1<br>Bit 1 - PHY Locked, 0 = not locked, 1 = locked<br>Bits 2 to 7 - Reserved set to 0s |
| 1 | Frequency compensation |
| 2 to 13 | Reserved. Set to 0s |
| 14, 15 | Parity |

WIRED COMMUNICATION SYSTEM INCLUDING ASYMMETRICAL PHYSICAL LAYER DEVICES

CROSS-REFERENCE TO RELATED APPLICATIONS

This application is a Continuation of U.S. patent application Ser. No. 17/371,031, filed on Jul. 8, 2021 and claims the benefit of U.S. patent application Ser. No. 17/035,593, filed on Sep. 28, 2020, U.S. Provisional Application No. 62/907,039, filed on Sep. 27, 2019, U.S. Provisional Application No. 62/933,464 filed on Nov. 10, 2019 and U.S. Provisional Application No. 62/961,443 filed on Jan. 15, 2020. The entire disclosures of the applications referenced above are incorporated herein by reference.

FIELD

The present disclosure relates to data communication systems, and more particularly to wired data communication systems including asymmetrical physical layer devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A computing device such as a computer, tablet, router and/or server typically includes a network interface that transmits and receives data at high speed over a medium such as a cable. The network interface typically includes a medium access controller (MAC) and a physical layer device (PHY). The MAC provides an interface between a host device such as the computer and the PHY provides an interface between the MAC and the medium. The PHY includes a transmitter and a receiver.

The computing device is connected by the network interface and the medium to a network interface of another device such as a router. The router is connected to network interfaces of other devices such as a cable modem, a printer, or other network device. Typically, the communication links between the devices are bidirectional. The network interfaces are configured to support data flows at high speed in both directions.

In other applications, the network interfaces handle data flows that are asymmetric in that they flow at high speed in one direction and at low speed in the opposite direction. For example, vehicles increasing include cameras, sensors and/or other high speed data generating devices that are used for autonomous control systems, driver assist systems, safety systems, etc. The cameras, sensors and/or other devices generate high speed data flows in one direction when they are operational. The high speed data flows are usually transmitted to a controller that is located remotely from the cameras, sensors and/or other high speed data generating devices. However, the controller only needs to transmit low speed data (such as control data) back to the cameras, sensors and/or other high speed data generating devices. Furthermore, the control data is generated infrequently.

The high-speed, bidirectional communication links that have been developed for computing devices are not ideally suited for the asymmetrical communication links found in vehicles. The power consumption and cost of the high-speed, bidirectional communication links are prohibitive in automotive applications where multiple cameras and sensors are used. Furthermore, power consumption of the high-speed, bidirectional communication links is too high for vehicle applications (particularly for electric or hybrid vehicles). In other words, supporting a high speed link from the controller back to the cameras, sensors and/or other high speed data generating devices is inefficient.

SUMMARY

A first physical layer device comprises a first transmitter and a first receiver. The first transmitter transmits first data to a second physical layer device over a medium at a first line rate during a first transmit period. The first receiver is configured to not receive data during the first transmit period and an echo reflection period occurring after the first transmit period. The echo reflection period is based on a length of the medium between the first physical layer device and the second physical layer device. The first receiver is configured to, after the echo reflection period, receive second data from the second physical layer device over the medium at a second line rate that is less than the first line rate.

In other features, the first transmitter transmits N bits per symbol, and the first receiver receives M bits per symbol, where N is greater than or equal to M.

In another feature, N is greater than 1 and M is equal to 1.

In another feature, the first transmitter uses pulse amplitude modulation (PAM) 4 and the receiver uses PAM 2.

In another feature, the first physical layer device further comprises an encoder to perform forward error correction on the first data. The second data received by the first receiver does not include forward error correction.

In another feature, the first physical layer device further comprises an encoder to perform Reed-Solomon encoding on the first data. The second data transmitted by the first transmitter does not include forward error correction.

In another feature, the first physical layer device further comprises a FIFO buffer to receive the first data and to output the first data to the encoder.

in another feature, the medium comprises a single pair of wires.

In another feature, the medium comprises an unshielded twisted pair cable.

In another feature, the medium comprises a shielded twisted pair cable.

In another feature, the medium comprises a coaxial cable.

In another feature, the first data, the second data, and power are transmitted on the medium.

In other features, a link segment comprises the first physical layer device, and the second physical layer device. The second physical layer device is connected to the medium and located remote from the first physical layer device. The second physical layer device comprises a second receiver and a second transmitter. The second receiver receives the first data at the first line rate during the first transmit period. The second transmitter is configured to not transmit data during the first transmit period and during a first period, equal to one-half of the echo reflection period, after the first transmit period. The second transmitter is configured to, after the first period, receive and transmit the second data on the medium at the second line rate.

In another feature, the link segment further comprises a clock recovery circuit to generate a recovered clock signal based on the first data from the first transmitter and to output the recovered clock signal to the second transmitter.

In another feature, the second physical layer device operates as a master and the first physical layer device operates as a slave.

In another feature, the first physical layer device operates as a master and the second physical layer device operates as a slave.

In still other features, a physical layer device comprises a first receiver and a first transmitter. The first receiver receives first data at a first line rate from a second physical layer device over a medium during a first receive period. The first transmitter is configured to not transmit data during a first period, equal to one-half of an echo reflection period, after the first receive period. The echo reflection period is based on a length of the medium between the first physical layer device and the second physical layer device. The first transmitter is configured to, after the first period, transmit second data to the second physical layer device over the medium at a second line rate that is less than the first line rate.

In other features, the first receiver receives M bits per symbol, and the first transmitter transmits N bits per symbol, where M is greater than N.

In another feature, where M is greater than 1 and N is equal to 1.

In another feature, the first transmitter uses pulse amplitude modulation (PAM) 2 and the first receiver uses PAM 4.

In other features, the physical layer device further comprises a decoder to perform forward error correction decoding on the first data. The second data transmitted by the first transmitter does not Include forward error correction.

In other features, the physical layer device further comprises a decoder to perform Reed-Solomon decoding on the first data. The second data transmitted by the first transmitter does not include forward error correction.

In another feature, the medium comprises a single pair of wires.

In another feature, the medium comprises an unshielded twisted pair cable.

In another feature, the medium comprises a shielded twisted pair cable.

In another feature, the medium comprises a coaxial cable.

In another feature, the first data, the second data, and power are transmitted on the medium.

In another feature, the first physical layer device operates as a master.

In another feature, the first physical layer device operates as a slave.

In still other features, a data link layer device for an asymmetric wired interface comprises a protocol translating module to receive source frames in a source protocol and to translate the source protocol into a tunneling protocol. The tunneling protocol includes f fixed frame sizes, where f is an integer greater than one, and an $i^{th}$ one of the f fixed frame sizes, in order of increasing payload size, has a payload of $p_i$ bytes, where i is an integer from 1 to f. The protocol translating module includes a slicing module configured to slice the source frames into one or more fixed frames having one or more of the f fixed frame sizes. The protocol translating module includes a header/trailer adding module configured to add headers and trailers having a length of h bytes to each of the one or more fixed frames. $p_{i+1}/p_i$ is equal to an integer for i=1 to (f−1). $(h+p_{i+1})/(h+p_i)$ is equal to an integer for i=1 to (f−1).

In another feature, the header added by the header/trailer adding module includes a header field indicating a frame type.

In another feature, the header added by the header/trailer adding module includes a header field indicating a number of valid payload bytes.

In another feature, the trailer added by the header/trailer adding module includes a trailer field including a checksum.

In another feature, the source frame includes a payload of a b-bit symbol Reed Solomon code of (n, k) where at least one of $[8\times(h+p_i)]/[k\times b]$ is an integer, and $[k\times b]/[8\times(h+p_i)]$ is an integer for i=1 to f.

In another feature, n=243, k=216, and b=8.

In other features, f is equal to 3. A first payload $p_1$ of a first one of the first plurality of fixed frames is equal to 16. A second payload $p_2$ of a second one of the first plurality of fixed frames is equal to 64. A third payload $p_3$ of a third one of the first plurality of fixed frames is equal to 640. h=8.

In other features, a wired interface comprises the data link layer and a physical layer device configured to transmit the one or more fixed frames onto a wired medium.

In another feature, the physical layer device is configured to transmit the one or more fixed frames at a first transmit speed and to receive data at a second receive speed that is lower than the first transmit speed.

In other features, the physical layer device is configured to transmit the one or more fixed frames during a first portion of a cycle at a first transmit speed and to receive data from a link partner during a second portion of the cycle at a first receive speed equal to the first transmit speed. The first portion of the cycle has a duration that is longer than the second portion of the cycle.

In still other features, an asymmetric wired interface comprises a first interface that translates first source frames from a first source protocol by slicing the first source frames into a first plurality of fixed size frames of a tunneling protocol, adding at least one of a header and a trailer having a length of h bytes to each of the first plurality of fixed size frames, and transmitting the first plurality of fixed size frames on a medium. The first plurality of fixed size frames of the tunneling protocol include f fixed frame sizes where f is an integer greater than one. An $i^{th}$ one of the f fixed frame sizes, in order of increasing payload size, has a payload of $p_i$ bytes, where i is an integer from 1 to f. $p_{i+1}/p_i$ is equal to an integer for i=1 to (f−1). $(h+p_{i+1})/(h+p_i)$ is equal to an integer for i=1 to (f−1).

In other features, the first interface receives a second plurality of fixed size frames in a tunneling protocol from a link partner, removes at least one of a header and a footer, and recombines two or more of the second plurality of fixed size frames into a second source frame.

In another feature, the second plurality of fixed frames from a link partner uses t of the f fixed frame sizes, where t is an integer less than f.

In still other features, an asymmetric wired interface comprises a data link layer device and a physical layer device. The data link layer device translates first source frames from a first source protocol into a first plurality of fixed size frames of a tunneling protocol. The tunneling protocol includes f fixed frame sizes where f is an integer greater than one, and where payloads of the f fixed frame sizes are integer multiples of each other. The physical layer device is configured to transmit the first plurality of fixed size frames on a medium at a transmit rate and to receive a second plurality of fixed size frames of the tunneling protocol at a receive rate that is different than the transmit rate.

In another feature, the transmit rate is greater than the receive rate.

In another feature, the second plurality of fixed size frames use less than f of the fixed frame sizes.

In another feature, the transmit rate is less than the receive rate.

In another feature, the first plurality of fixed size frames use less than f of the fixed frame sizes.

In still other features, a first physical layer device comprises a first transmitter and a first receiver. The first transmitter is configured to, during a training mode, transmit N transmit bursts at a first line rate over a cable during a downstream transmit period, where N is an integer greater than zero, to train a second receiver of a second physical layer device. The first receiver is configured to, during the training mode, receive M transmit bursts at a second line rate over the cable during an upstream transmit period from a slave transmitter of the second physical layer device, where M is an integer greater than zero. The first transmitter is configured to, during the training mode, transmit P transmit bursts at a first line rate over a cable during P periods corresponding to the upstream transmit period to the second receiver, where P is an integer greater than zero. The first receiver is configured to receive Q transmit bursts at a second line rate over the cable during Q periods equal to the downstream transmit period from the second receiver, where P is an integer greater than zero. The first line rate is greater than or equal to the second line rate and the downstream transmit period is greater than or equal to the upstream transmit period. The first transmitter and first receiver communicate asymmetrically with the second physical layer device.

In another feature, the N transmit bursts and the Q transmit bursts include a training header including a training pattern and one or more training frames.

In another feature, the training pattern includes a known bit sequence.

In another feature, after the first physical layer device establishes a link with the second physical layer device, the first transmitter generates R transmit bursts including a training header and one or more data frames during a period equal to the downstream transmit period, where R is an integer greater than zero.

In another feature, after the first physical layer device establishes a link with the second physical layer device, the first transmitter receives S transmit bursts from the slave transmitter of the second physical layer device during a period equal to the upstream transmit period, where 5 is an integer greater than zero.

In another feature, after the first transmitter and the first transmitter establish a link, the first transmitter generates R transmit bursts including a training header and one or more data frames during a period equal to the upstream transmit period, where r is an integer greater than zero.

In another feature, after the first transmitter and the slave transmitter establish the link, the first transmitter receives S transmit bursts from the slave transmitter of the second physical layer device during a period equal to the downstream transmit period, where S is an integer greater than zero.

In another feature, the first physical layer device further comprises a PHY state machine to control the first transmitter and the first receiver based on a state of the PHY state machine.

In another feature, the PHY state machine includes a slave training state. The PHY state machine causes the first transmitter to generate the N transmit bursts during the slave training state.

In another feature, the PHY state machine includes a master training state. The state machine transitions to the master training state in response to detecting a signal from the second receiver and causes the first transmitter to generate the P transmit bursts during the master training state.

In another feature, the first physical layer device further comprises an equalization and timing recovery circuit to indicate when clock/data recovery are locked. The PHY state machine includes a countdown state. The PHY state machine transitions from the master training state to the countdown state in response to the first receiver and the second receiver being locked.

In another feature, the PHY state machine includes a finalize state, and the PHY state machine transitions from the countdown state to the finalize state in response to a countdown period elapsing while in the countdown state.

In another feature, the PHY state machine includes a link up state, and the PHY state machine transitions from the finalized state to the link up state in response to a finalize period elapsing while the first receiver and the second receiver are locked.

In another feature, the first physical layer device further comprises a frequency offset calculator configured to calculate a local frequency adjustment based on a first symbol rate of the first line rate and a grandmaster clock.

In another feature, the first physical layer device further comprises a first multiplexer configured to receive one of the local frequency adjustment and a remote frequency adjustment and to select the local frequency adjustment when operating in a first state and to select the remote frequency adjustment when operating in a second state.

In another feature, the first physical layer device further comprises a phase interpolator/accumulator configured to receive an output of the first multiplexer and to generate a first transmit clock.

In another feature, the first physical layer device further comprises a second multiplexer configured to receive the first transmit clock from the phase interpolator/accumulator and a recovered clock and to output one of the first transmit clock and the recovered clock as a transmit clock to the first transmitter.

In another feature, the first state corresponds to a leader state and the second state corresponds to a follower state.

In another feature, the first physical layer device further includes an encoder to encode the one or more training frames of the N transmit bursts.

In another feature, the encoder performs forward error correction encoding.

In another feature, the first physical layer device further comprises a pulse amplitude modulation (PAM) mapper using a first PAM level during the training mode and a second PAM level for the one or more data frames during a normal mode after a link is established. The first PAM level and the second PAM level are different.

In another feature, the one or more training frames include a known bit sequence, a locked field for the first receiver indicating a lock status of a clock and data recovery circuit of the first physical layer device and a leader/follower field indicating a leader/follower status of the first physical layer device.

In another feature, the one or more training frames include a frame count field including a number of frames sent during the training mode.

In another feature, the one or more training frames include a cycle count field including a number of full transmit cycles that have occurred since a state machine of the first physical layer device enters a master training state.

In another feature, the one or more training frames include a countdown cycle field to identify a full transmit cycle to transition from the training mode to a normal mode.

In another feature, during the training mode, the first transmitter transmits a first transmit burst to the second physical layer device, receives a second transmit burst from the second physical layer device after a first delay period, transmits a third transmit burst after a second delay period, and receives a fourth transmit burst after a third delay period.

In another feature, during at least one transmit cycle including sequentially sending a transmit burst and receiving a transmit burst, the first transmitter transmits a transmit burst using the upstream transmit period and receives a second transmit burst from the second physical layer device using the upstream transmit period.

In still other features, a first physical layer device comprises a first transmitter, a first receiver, and a delay calculator. The first transmitter is configured to send first transmit bursts on a cable at a first line rate during a first transmit period to a second physical layer device. The first transmit bursts include a training header and a training frame including a timing field. The first receiver is configured to receive second transmit bursts on the cable at a second line rate during a second transmit period from the second physical layer device. During a normal operating mode, the first line rate is greater than or equal to the second line rate and the first transmit period is greater than or equal to the second transmit period. The first transmitter and first receiver communicate asymmetrically with the second physical layer device. The delay calculator is configured to selectively adjust a first quiet period between an end of the first transmit bursts from the first transmitter and echo caused by a start of the second transmit bursts from a slave transmitter of the second physical layer device.

In another feature, the first quiet period is initially set based on a maximum length of the cable.

In another feature, the delay calculator is further configured to selectively adjust a second quiet period between an end of the second transmit bursts from the slave transmitter of the second physical layer device and echo caused by a start of the first transmit bursts from first transmitter.

In another feature, the delay calculator initially sets the first quiet period equal to a difference between a first delay constant and one half of a propagation delay between the first transmitter and a second receiver of the second physical layer device based on a maximum length of the cable.

In another feature, the delay calculator calculates an adjusted first quiet period based on the first quiet period and an adjustment.

In another feature, the delay calculator determines a first delay from an end of the first transmitter transmitting one of the first transmit bursts to a start of the first receiver receiving one of the second transmit bursts.

In another feature, the delay calculator determines the adjustment based on a difference between the first delay constant and one half of a sum of the first quiet period and the first delay.

In another feature, the delay calculator transmits the adjustment to the second physical layer device in the timing field of the training frame of one of the transmit bursts.

In another feature, the first physical layer device further comprises an encoder configured to encode the training frame of the first transmit bursts.

In another feature, the encoder performs forward error correction encoding.

In another feature, the second transmit bursts include a training header and a training frame, and the first physical layer device further comprises a decoder configured to decode the training frame of the second transmit bursts.

In another feature, the decoder performs forward error correction decoding.

In another feature, the delay calculator includes an accumulator to determine a difference between an expected cycle count based on a grandmaster clock and an actual cycle count based on a clock of the first transmitter.

In still other features, a first physical layer device comprises a first transmitter and a first receiver. The first transmitter is configured to send first transmit bursts on a cable at a first line rate during a first transmit period to a second physical layer device. The first transmit bursts include a training header and T frames, where T is an integer greater than zero. The first receiver is configured to receive second transmit bursts on the cable at a second line rate during a second transmit period from the second physical layer device. The second transmit bursts include a training header and P frames, where P is an integer greater than zero, During a normal operating mode, the first line rate is greater than or equal to the second line rate and the first transmit period is greater than the second transmit period. A transmit cycle includes one of the first transmit bursts and one of the second transmit bursts. The first transmitter transmits in-band data including B bytes over two or more of the T frames, where B is an integer greater than one.

In another feature, the first receiver receives in-band data including C bytes over two or more of the P frames, where C is an integer greater than one.

In still other features, a first physical layer device comprises a first transmitter, a first receiver, and a frequency offset calculator. The first transmitter is configured to send first transmit bursts on a cable at a first line rate during a first transmit period to a second physical layer device. The first transmit bursts include a training header and a training frame including a timing field. The first receiver is configured to receive second transmit bursts on the cable at a second line rate during a second transmit period from the second physical layer device. During a normal operating mode, the first line rate is greater than or equal to the second line rate and the first transmit period is greater than or equal to the second transmit period. The first transmitter and first receiver communicate asymmetrically with the second physical layer device. The frequency offset calculator is configured to calculate a local frequency adjustment based on a first symbol rate of the first line rate and a grandmaster clock.

BRIEF DESCRIPTION OF DRAWINGS

FIGS. 14 and 15 are functional block diagrams of examples of link segments using multiple signal levels and forward error correction according to the present disclosure;

FIG. 19 is a more detailed functional block diagram of an example of a protocol translating module configured to translate from one of the source protocols to the tunneling protocol according to the present disclosure;

FIG. 20 illustrates examples of source frames, sliced source frames and sliced source frames with headers and/or trailers according to the present disclosure;

FIG. 25 is a table illustrating an example of a header format;

FIG. 28 illustrates examples of downstream and upstream transmit parameters according to the present disclosure;

FIGS. 29 and 30 illustrate an example of a training sequence for upstream and downstream master and slave PHYs according to the present disclosure;

FIG. 32 is a table of an example of byte definitions for a training header according to the present disclosure;

FIG. 33 is a table illustrating examples of line speed, frame size and frames per transmit burst according to the present disclosure;

FIGS. 34-36 are timing diagrams for asymmetric communication between a master PHY and a slave PHY assuming actual cable lengths according to the present disclosure;

In the drawings, reference numbers may be reused to identify similar and/or identical elements.

DESCRIPTION

Figure 1:
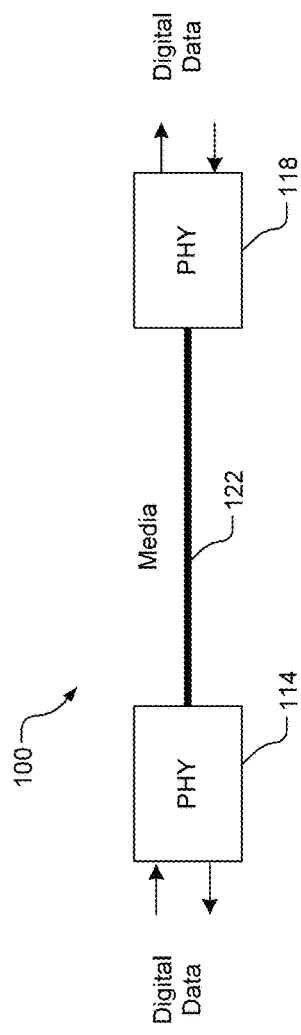
FIG. 1 is a functional block diagram of an example of a link segment.

Referring now to FIG. 1, a point-to-point link segment 100 transfers digital data and Includes a medium 122 that is terminated by physical layer devices (PHYs) 114 and 118 on each end. The PHYs 114 and 118 include transmitters and receivers. The PHYs 114 and 118 convert the digital data to/from a modulated analog signal. As the signal is transmitted over the medium 122, it is degraded by both the limited bandwidth of the medium 122 as well as external noise interference. The PHYs 114 and 118 include circuitry to modulate a signal at the transmitter and reconstruct a degraded signal at the receiver so that messages can be passed reliably between the two end points of the link segment 100.

The PHYs 114 and 118 traditionally operate with symmetrical speeds in both directions of the link segment 100. As transmission speed increases, power dissipation and the number of transistors needed to implement the PHYs 114 and 118 increases, which increases cost.

In some applications (such as connecting a camera, sensor or other device that is remote from a controller), the bulk of the data transfer is in one direction. In other words, the bulk of the data transfer is from the device to the controller. The data from the controller to the device occurs only occasionally and consists mostly of commands from the controller (i.e. turn on/off). In these systems, running PHYs with symmetrical speeds in both directions increases power, costs, and decreases reliability.

Figure 2:
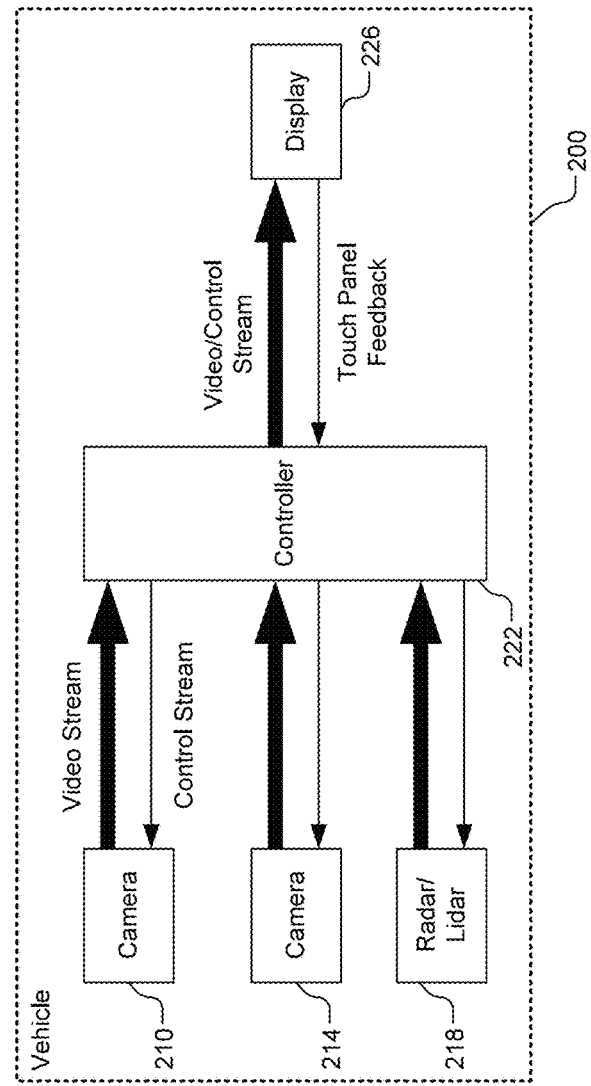
FIG. 2 is a functional block diagram of an example of a vehicle sensing system including one or more cameras and/or one or more sensors, a controller and a display.

Referring now to FIG. 2, an example of a vehicle sensing system for a vehicle such as an autonomous or non-autonomous vehicle is shown. The vehicle sensing system includes one or more cameras 210 and 214 and/or one or more sensors 218 such as a radar sensor, an infrared sensor and/or a LIDAR sensor. Outputs of the cameras 210 and 214 and the sensor 218 are transmitted to a controller 222 at high speed. A display 226 such as a touchscreen may receive video signals from the cameras 210 and 214 after processing by the controller 222. The display 226 also sends a control stream including control signals to the controller 222. The control signals may adjust operation of the display, the cameras, the sensors or other vehicle functions or parameters. The controller 222 sends a control stream including control signals back to the cameras 210 and 214 and/or the sensor 218 at low speed.

As can be appreciated, the bulk of the data transfer is in one direction. In particular, the data transfer is predominantly from the cameras 210 and 214 or the sensor 218 to the controller 222. The control stream from the controller 222 to the cameras 210 and 214 occurs only occasionally and usually includes commands to the camera (i.e. turn on/off). In these systems, running the PHYs 114 and 118 with symmetrical speeds in both directions increases power consumption and cost and decreases reliability.

As will be described further below, the present disclosure relates to PHYs that operate with asymmetrical speeds to reduce power consumption and cost and to increase reliability. In other words, the PHYs operate at high speed in one direction and low speed in the opposite direction.

Figure 3B:
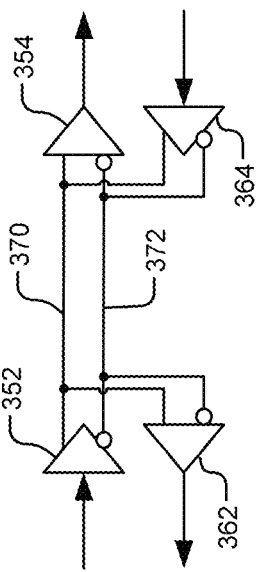
FIGS. 3A and 3B are electrical schematics of examples of dual simplex and duplex links.
Figure 3A:

Referring now to FIGS. 3A and 3B, different types of media are shown. For example, the medium may include a cable including a pair of wires, a coaxial cable, an unshielded twisted pair or a shielded twisted pair. In FIG. 3A, a dual simplex connection is shown to include a transmitter 320 and a receiver 322 connected by a cable including conductors 326 and 328 to transmit in one direction. The dual simplex connection includes a transmitter 332 and a receiver 330 connected by a cable including conductors 336 and 338 to transmit in the opposite direction. In FIG. 3B, a duplex connection is shown to include a transmitter 352 and a receiver 362 connected by a cable including conductors 370 and 372 to transmit in one direction. The duplex connection includes a transmitter 354 and a receiver 364 connected by the same conductors 370 and 372 to transmit in the opposite direction.

In certain applications such as automotive applications, the medium 122 includes copper cables to connect the PHYs 114 and 118 since copper cables are inexpensive, robust against temperature, vibration, and repetitive bending (i.e. car doors) as compared to optical cables. It is also advantageous to transmit signals in both directions on the same copper cable at the same time (duplex) instead of having two sets of copper cables each running signals in a single direction (dual simplex). Using a single copper cable reduces the weight and cost of the medium 122. PHYs 114 and 118 typically operate symmetrically (not asymmetrically) over the same copper cable.

Copper also has the advantage that it can transmit power over the same cable used for data to save weight and cost. In an ideal power delivery circuit, only DC current flows in the cable. In reality, the regulator used to deliver power generates low frequency noise on the cable that can interfere with the signal.

Figure 4:
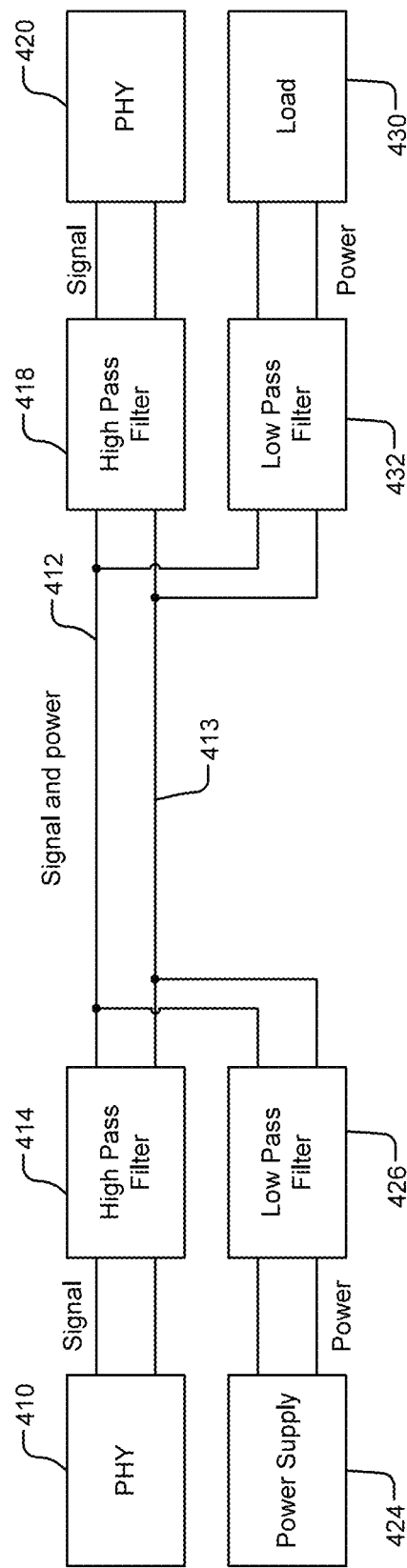
FIG. 4 is a functional block diagram of an example of a link segment including filters and supplying power over the medium.

Referring now to FIG. 4, an example of filtering to allow frequency division multiplexing is shown, A PHY 410 is connected to first and second conductors 412 and 413 via a high pass filter 414. The conductors 412 and 413 are connected to a high pass filter 418 and PHY 420, A power supply 424 associated with the PHY 410 is connected by a low pass filter 426 to the first and second conductors 412 and 413. The high pass filter 414 is bidirectional since the signal flows in both directions. The filtering will also work to isolate the PHYs from the power when the PHYs are operating. A load 430 (such as one of the cameras and/or sensors) is connected by a low pass filter 432.

The high pass filters 414 and 418 filter out power supply noise. The low pass filters 426 and 432 are used to filter out the signal from the power supply. It is advantageous to modulate the signal such that very little energy appears in the low frequency band. The higher the frequency that can be used for the cutoff between the low pass filter and high pass filter, the smaller the physical size of the filter, which reduces the cost of the low pass filter.

In order to transmit signals simultaneously in both directions over the copper cable, a transmission rate of the PHYs operates in a frequency locked manner. One PHY is designated the master PHY and the other PHY is the slave PHY. The slave PHY recovers a transmit frequency of the master PHY and uses that frequency to transmit its signal (or vice versa). Since the signals in both directions are generated at the same frequency in a symmetric system, it is possible for the PHY to cancel out its own transmit signal and any reflection of the transmit signal so that the received signal from the other transmitter can be recovered.

Figure 5:
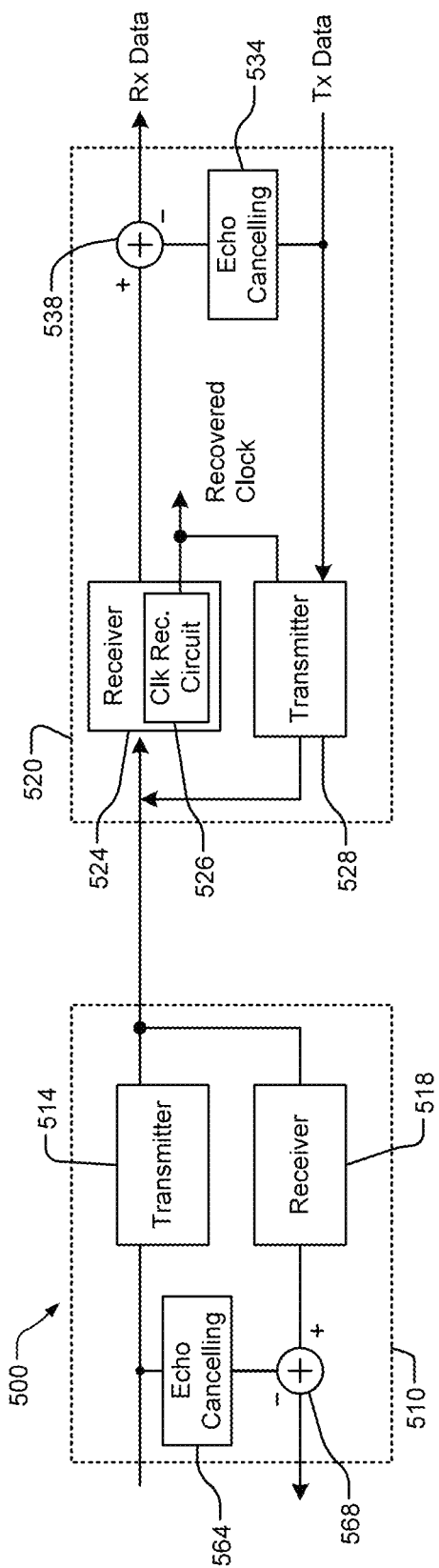
FIG. 5 is a functional block diagram of an example of a link segment including a master PHY and a slave PHY and a clock recovery circuit.

Referring now to FIG. 5, a link segment 500 includes a master PHY 510 including a transmitter 514 and a receiver 518. A slave PHY 520 includes a transmitter 528 and a receiver 524. The receiver 524 includes a clock recovery circuit 526 to generate a recovered clock signal. The recovered clock signal is output to the transmitter 528. An echo cancelling circuit 534 removes a locally transmitted signal from a received signal from the transmitter 514 (using a summing circuit 538). Likewise, an echo cancelling circuit 564 removes a locally transmitted signal from a received signal from the transmitter 528 (using a summing circuit 568).

In principle, two PHYs operating symmetrically can transmit data asymmetrically by entering into an energy efficient mode. The PHY that does not need to transmit full data rate can periodically turn its transmitter on and off. This can be synchronized with the other PHY (link partner) so that the link partner can turn its receiver on and off. By using this approach, some power savings can be achieved. When there is data to send, the PHY transmitter and the PHY receiver are turned on and data is sent in a burst over the link segment at full speed for a short period of time. When there is no more data to be transmitted, the PHY transmitter and the PHY receiver are shut down.

Figure 6:
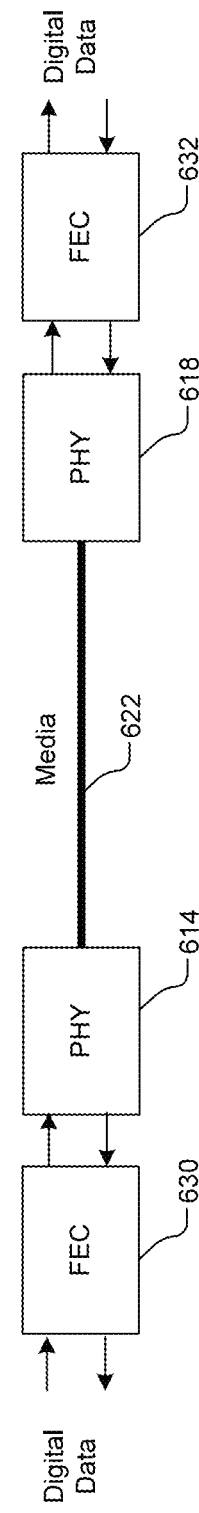
FIG. 6 is a functional block diagram of an example of a link segment using forward error correction.

Referring now to FIG. 6, as transmission speeds increase, the signal to noise ratio decreases due to higher cable attenuation at the higher speeds. It may be advantageous to employ forward error correction techniques to correct errors to overcome the lower signal to noise ratio, A point-to-point link segment 600 includes a medium 622 that is terminated by physical layer devices (PHYs) 614 and 618 on each end. The PHYs 614 and 618 include transmitters and receivers. The PHYs 614 and 618 convert the digital data to/from a modulated analog signal and apply forward error correction (FEC) at 630 and 632. As the signal is transmitted over the medium 622, it is degraded by both the limited bandwidth of the medium 622 and well as external noise interference. FEC is used to help recover the original signal. The PHYs 614 and 618 include circuitry to modulate a signal at the transmitter and reconstruct a degraded signal at the receiver so that messages can be passed reliably between the two end points on the link segment 600.

Another method to address attenuation on the medium is to modulate the signal over multiple amplitude levels (3 or 4 levels or more) and slow down the signal. There is a tradeoff between the number of levels and speed. For the same signal power, a higher number of levels brings the amplitude of the signal levels closer and decreases the signal to noise ratio. However running slower reduces the attenuation which helps increase the signal to noise ratio. Regardless of where the optimal tradeoff point is, a multilevel transmitter, receiver, and echo canceller are more complex and costly as compared to a 2 level transmitter.

Figure 7:
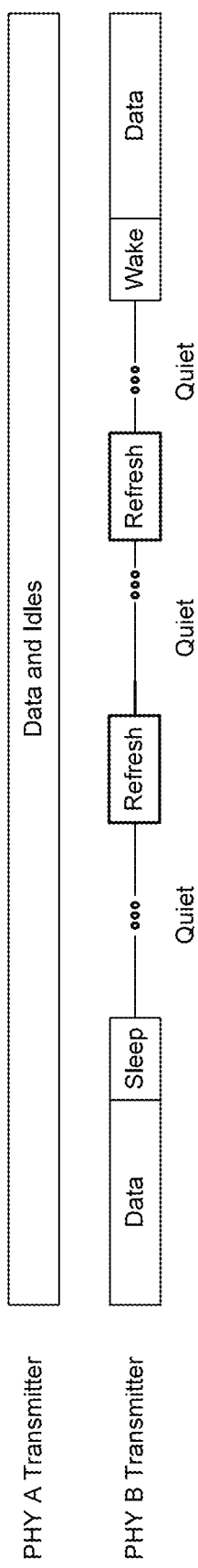
FIG. 7 is a timing diagram illustrating an example of asymmetric operation of transmitters of a link segment.

In a first approach for handing the above-identified problems, two PHYs operating symmetrically can transmit data asymmetrically by entering Into an energy efficient ethernet mode (EEE) as defined by IEEE 802.3. Referring now to FIG. 7, the PHY that does not need to transmit full data rate can periodically turn its transmitter on and off. This can be synchronized with the other PHY (link partner) so that the link partner can turn its receiver on and off. By doing this, some power savings can be achieved. When there is data to send, the PHY transmitter and receivers are turned on and data is bursted over the link segment at full speed for a short period of time. When there is no more data to be transmitted, the PHY transmitter and receiver are shut down. In the example below, PHY A is always transmitting data and idles. PHY B sends data, tells PHY A it is going to sleep, periodically sends refresh signals to keep the link parameters locked, issues a wake signal to wake up PHY B, and resumes transmitting data. Power is saved in the quiet periods.

There are several drawbacks to this approach. An expensive full speed echo canceller is required for both PHYs. A full speed transmitter/receiver is required in the low bandwidth direction. FEC may be required in the low bandwidth direction. The benefits are that lower cost filtering can be employed when transmitting power as the signals in both directions are confined to high frequencies.

Figure 8:
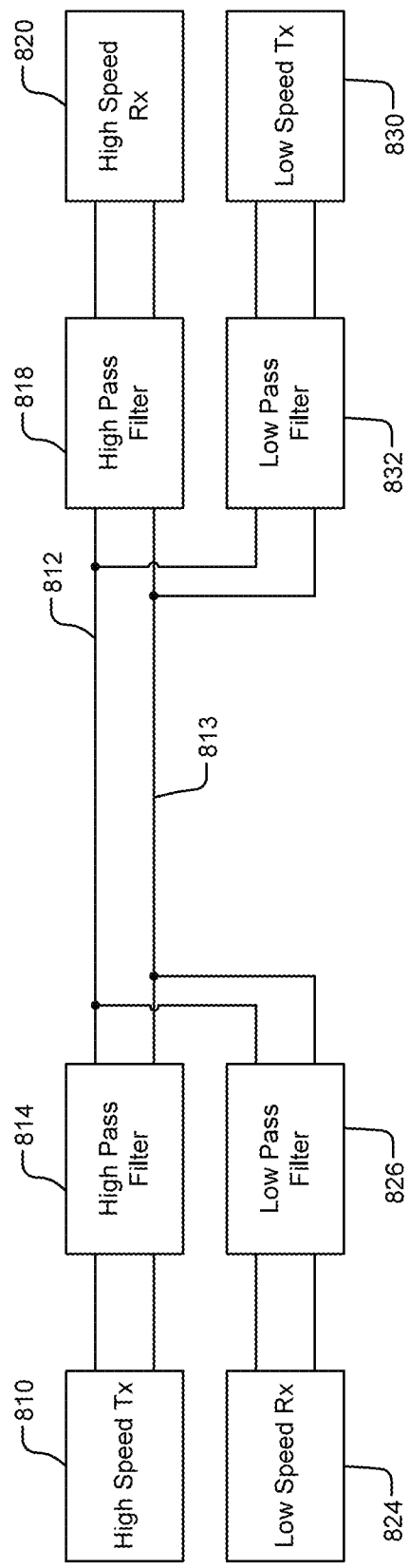
FIG. 8 is a functional block diagram of an example of a link segment with asymmetric transmitters and receivers operating at different speeds.

In a second approach, a low speed transmitter/receiver is used in the low bandwidth direction and the high speed and low speed signals are separated using high pass and low pass filtering. For example the high speed path can run at 10000 megabauds while the lower speed run at 100 megabaud. Referring now to FIG. 8, a high-speed transmitter 810 outputs a transmit signal through a high pass filter 814, over a medium (e.g. conductors 812, 813) to a high pass filter 818 and a high speed receiver 820 at an opposite end of the link segment. In the opposite direction, a low speed transmitter 830 transmits a signal through a low-pass filter 832, over the medium, to a low-pass filter 826 and a low speed receiver 824 at the opposite end of the link segment.

The advantages of this approach is that a simpler transmitter and receiver can be used in the slow path. The drawbacks of this approach include the need for a well-tuned high pass/low pass combination, which limits the flexibility of any PHYs that need to operate over multiple speeds as each speed needs to be finely tuned. There is also potentially still a need for echo cancellation to cancel out noise that the filters cannot fully cancel. This approach also requires more expensive filtering to filter out the power supply noise when power is transmitted over the same cable since the cutoff frequency is much lower.

Figure 9:
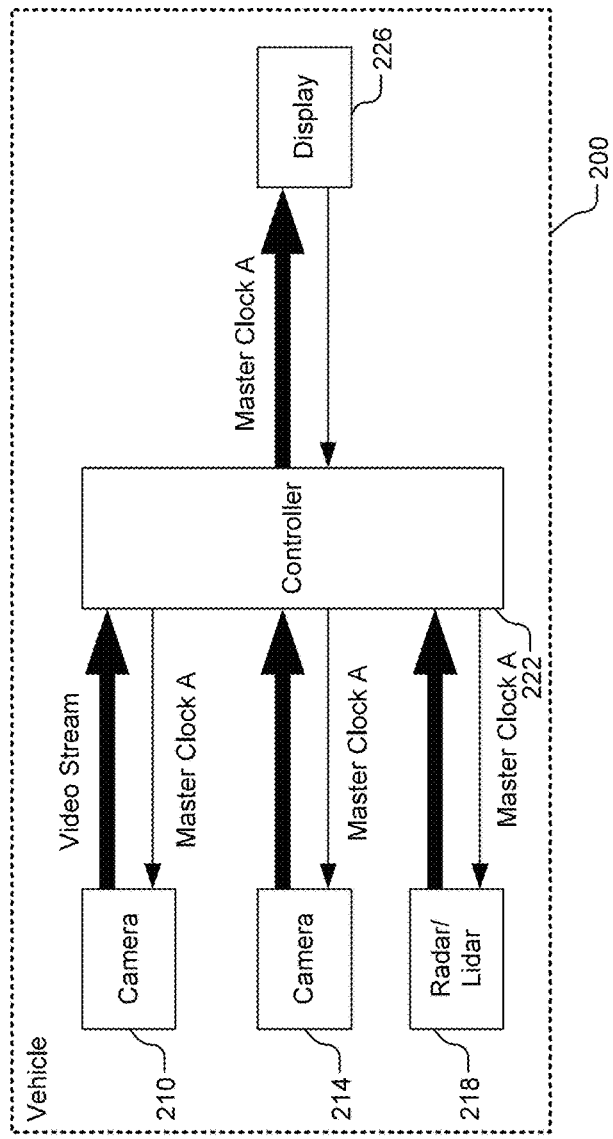
FIG. 9 is a functional block diagram of an example of a vehicle sensing system including one or more cameras and/or one or more sensors, a controller and a display.

Another drawback involves a use case where the low bandwidth direction is the master. Referring now to FIG. 9, it is advantageous for PHYs on the controller side to be the master and the PHYs on the camera to be slave. In this configuration, all of the cameras or sensors can be frequency locked to each other and hence send the same number of images per unit time.

Figure 10:
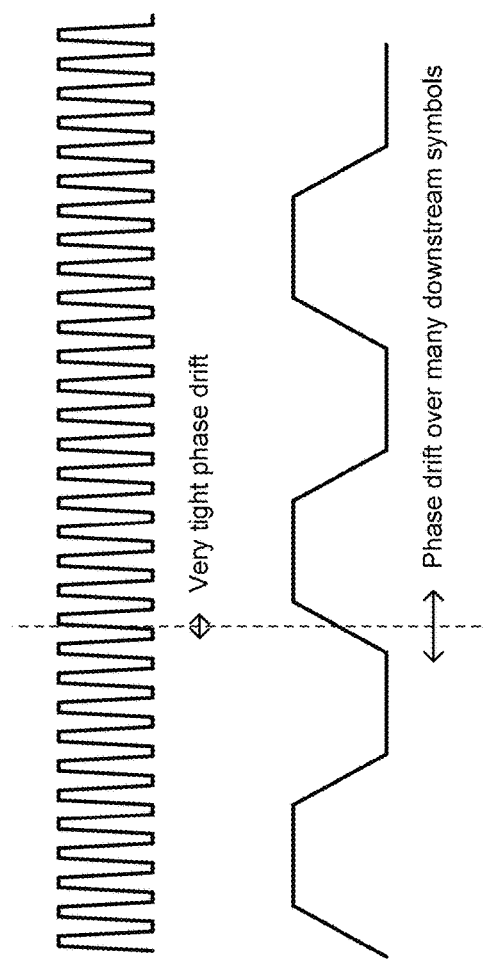
FIG. 10 are waveforms illustrating an example of phase drift.

Referring now to FIG. 10, since the slow signal has a slower slew rate, the recovered clock phase will drift over many fast clock cycles. In such a system, the system on the controller side has to account for the phase drift.

Systems and methods according to the present disclosure introduce an alternate approach that offers a middle ground where the difficulties of echo cancellation are removed while allowing for a simpler transmitter/receiver design in the low bandwidth direction.

Figure 11:
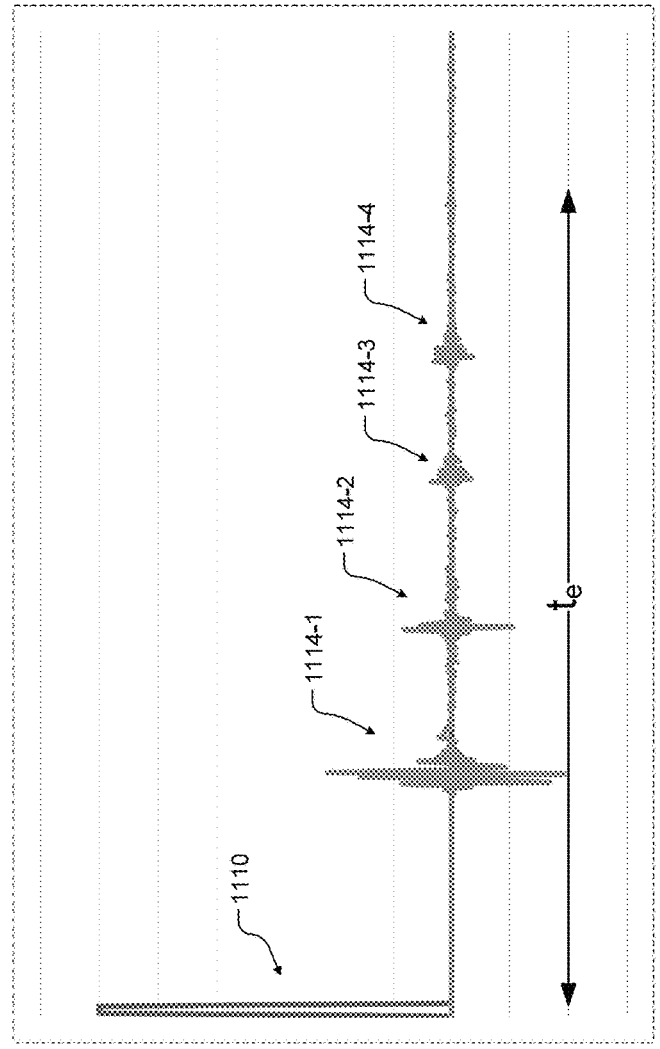
FIG. 11 are waveforms illustrating an example of a transmit signal and echo signals.

Referring now to FIG. 11, a pulse 1110 is transmitted by a transmitter at one end of the link segment and an echo 1114-1, 1114-2, 1114-3, and 1114-4 (collectively echo 1114) is seen at a receiver at the same end of the link segment. The echo is due to impedance mismatches on the medium (e.g. the cables and connectors). Assuming $t_e$ is the worst case period for the echo to subside, $t_e$ is a function of the length of cable. The propagation time along one direction is $t_e/2$ and the reflection takes $t_e/2$ to propagate back.

Figure 12:
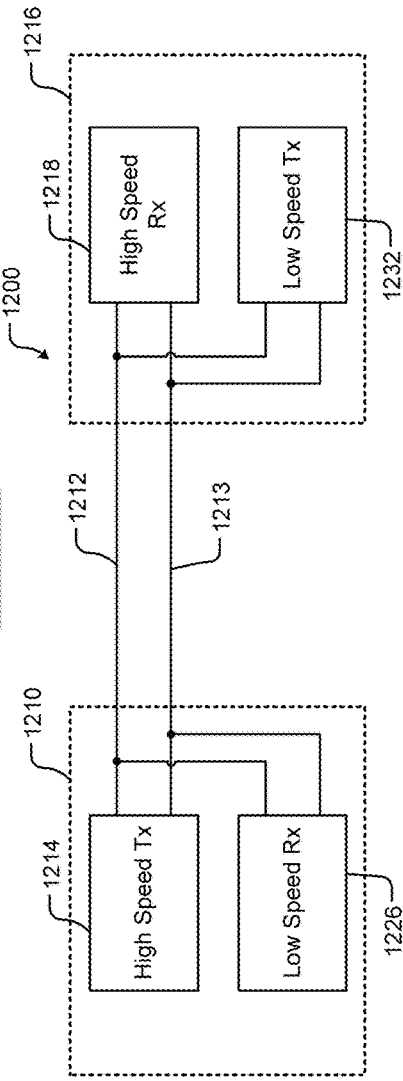
FIG. 12 is a functional block diagram of an example of asymmetric transceivers of a link segment according to the present disclosure.

Referring now to FIG. 12, a link segment 1200 includes PHY 1210 including a high speed transmitter 1214 connected by a medium (e.g, conductors 1212, 1213) to a high speed receiver 1218 of PHY 1216. The PHY 1216 includes a low speed transmitter 1232 connected by the medium to a low speed receiver 1226 of the PHY 1210.

Figure 13:
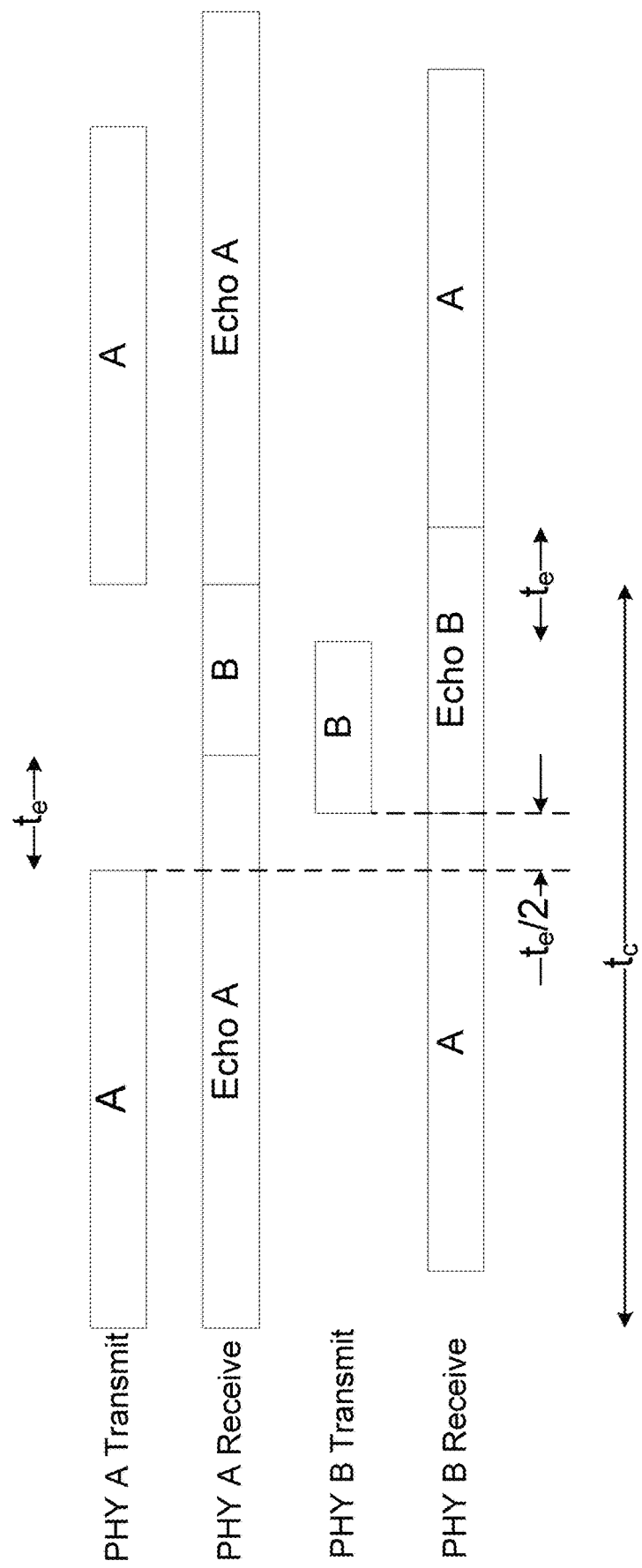
FIG. 13 is a timing diagram illustrating an example of timing of transmit and receive signals in asymmetric transceivers of a link segment according to the present disclosure.

Referring now to FIG. 13, instead of both PHYs 1210 and 1216 transmitting and receiving at the same time, if the PHYs take turns transmitting with a dead time of at least $t_e/2$, no echo cancellation will be required as the echo reflections and signal will not overlap in time. In practice, the delay should be slightly longer than $t_e/2$ to allow some margin between the echo reflections and the transmitted signal. In some examples, the delay is greater than or equal to the $t_e/2$ and less than or equal to $t_e$. In some examples, the delay is greater than or equal to the $t_e/2$ and less than or equal to $3t_e/4$. In some examples, the delay is greater than or equal to the $t_e/2$ and less than or equal to $5t_e/8$.

This technique will require slightly faster transmit and receive line rate. Let $t_c$=total time for PHY 1210 and PHY 1216 to transmit+2×dead time. $R_a$ and $R_b$ are the desired bitrate for PHY 1210 and 1216, respectively. $t_e$=2×dead time. Then, the line rate $R_l$ is computed as $R_l=(R_a+R_b)\times t_c/(t_c-t_e)$.

For example suppose $R_a$=10000 Mb/s, $R_b$=100 Mb/s, $t_c$=10000 ns and $t_e$=200 ns. Then, $R_l$=10306 Mb/s, which is about 3% faster than $R_a$=10000 Mb/s. This small increase in speed eliminates the complexities and cost of implementing echo cancellation or filtering. However, this does not eliminate the issue of requiring a fast transmitter and receiver in the slow direction and potentially requiring the FEC as well.

However, this approach can be modified to use a lower speed transmitter and receiver at the opposite end of the link segment. Note that the high pass and low pass filters and echo cancellation can be removed. S is the number of times slower that the slow direction is transmitted relative to the fast direction. In some examples, S is greater than 1 and less than or equal to 10.

The line rate for PHY 1210 (the faster one) is $R_{la}=(R_a+R_b*S)\times t_c/(t_c-t_e)$ and for PHY 1216 $R_{lb}=R_{la}/S$. Continuing with the example above, if S=5 then $R_{la}$=10714 Mb/s and $R_{lb}$=2143 Mb/s. So for an additional 4% increase (total 7%) in speed on the fast path, the slow path can be designed to run 5 times slower. While the slow path is still faster than $R_b$ of the second approach above, the reduction is significant compared to the fast path $R_{la}$. Since there is less attenuation in the slow path, the FEC can potentially be removed in the slow path. Since $R_{lb}$ is still much faster than $R_b$ any filtering needed to filter out power supply can be made much smaller hence saving cost.

Assuming the high speed path is running a multilevel greater than 2, the low speed path can run on 2 levels further reducing the cost. Let P=bit per symbol of fast path/bit per symbol of slow path then $R_{la}=(R_a+R_b*S*P) \times t_c/(t_c-t_e)$ and $R_{lb}=R_{la}/S$. Continuing the example above suppose P=PAM4/PAM2=2 bits/1 bit=2. $R_{la}$=11224 Mb/s and $R_{lb}$=2245 Mb/s. Loop timing is not required since no echo cancellation is required. However, loop timing is still useful for synchronizing the cameras as shown earlier. Because the ratio between $R_{la}$ and $R_{lb}$ is a lot smaller than $R_a$ and $R_b$, the phase drifting issue is smaller.

In summary, the complexities of echo cancellation can be removed when we alternate the transmission between 2 PHYs by a duration greater than ½ of the worst case echo reflection time. The complexity of the lower speed path can be reduced by running the slow path at a lower speed and/or with fewer levels. The FEC can be removed on the slower path as the signal to noise ratio is higher. Less expensive power supply filtering can be used.

Referring now to FIGS. 14 and 15, examples of different line speed, different transmit levels, with/without FEC, and/or the optional loop timing are shown. In FIG. 14, the low speed transmitter path is the master.

In FIG. 14, a communication system 1400 includes link partners 1410 and 1420. The link partner 1410 supports a first bit rate in its transmit path and a second bit rate in its receive path where the first bit rate is less than the second bit rate. The link partner 1410 includes a FIFO buffer 1420 receiving transmit data. An output of the FIFO buffer 1420 is input to a low speed PAM2 transmitter 1422. An output of the low-speed PAM2 transmitter outputs first data on a medium 1426 at a first line rate. The link partner 1412 includes a low-speed PAM2 receiver 1430 that receives the first data at the first line rate and outputs the data to a FIFO buffer 1432. A clock recovery circuit 1436 recovers a clock from the low-speed PAM2 receiver 1430, multiplies the clock by a factor S, and outputs the recovered clock to a high-speed PAM4 transmitter 1438.

The high-speed PAM4 transmitter 1438 receives transmit data from a FIFO buffer 1440 (after FEC encoder 1442 encodes the data) and outputs second data to the medium 1426 at a second line rate the link partner 1410 includes a high-speed PAM4 receiver 1450 that receives the second data at the second line rate. The link partner 1410 includes a forward error correction decoder 1452 that performs forward error correction decoding (there is no FEC on the low speed transmit path) and a FIFO buffer 1454 that temporarily stores the second data. In this example, the first bit rate and the first line rate are less than the second bit rate and the second line rate. The first bit rate is less than the first line rate and the second bit rate is less than the second line rate. In some examples, the FEC includes Reed-Solomon FEC. In FIG. 14, the low speed transmitter path is the master. In FIG. 15, the high speed transmitter path is the master.

In FIG. 15, a communication system 1500 includes link partners 1510 and 1512. The link partner 1510 supports a first bit rate in its transmit path and a second bit rate in its receive path where the first bit rate is greater than the second bit rate. The link partner 1510 includes a FIFO buffer 1520 receiving transmit data. An output of the FIFO buffer 1520 is input to a FEC decoder 1521 and then to a high-speed PAM4 transmitter 1522. The high-speed PAM4 transmitter 1522 outputs first data on a medium 1526 at a first line rate. The link partner 1512 includes a high-speed PAM4 receiver 1530 that receives the first data at the first line rate and outputs the data to a FEC decoder 1531 and a FIFO buffer 1532. A clock recovery circuit 1536 recovers a clock from the high-speed PAM4 receiver 1530, divides the clock by a factor S, and outputs the recovered clock to a low-speed PAM2 transmitter 1538.

The low-speed PAM2 transmitter 1538 receives transmit data from a FIFO buffer 1540 and outputs second data to the medium 1526 at a second line rate. The link partner 1510 includes a low-speed PAM2 receiver 1550 that receives the second data at the second line rate. The link partner 1510 includes a FIFO buffer 1554 that temporarily stores the second data. In this example, the first bit rate and the first line rate are greater than the second bit rate and the second line rate. The first bit rate is less than the first line rate and the second bit rate is less than the second line rate.

Figure 16:
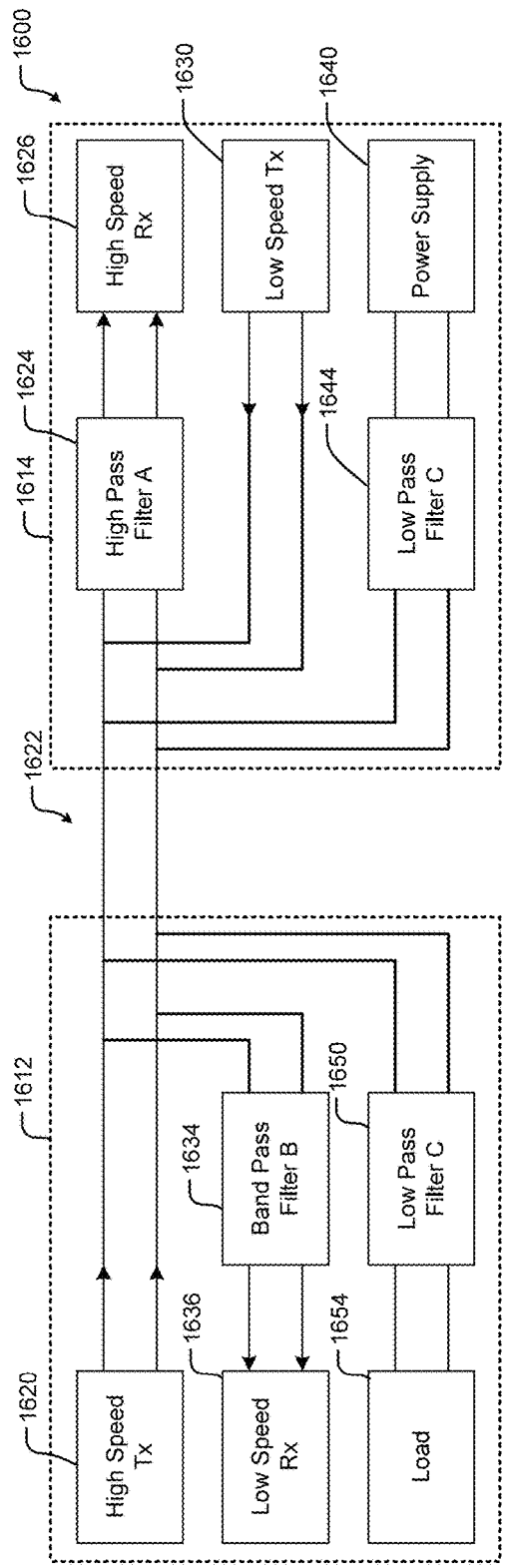
FIGS. 16 and 17 are functional block diagrams of examples of link segments using filtering according to the present disclosure.
Figure 17:
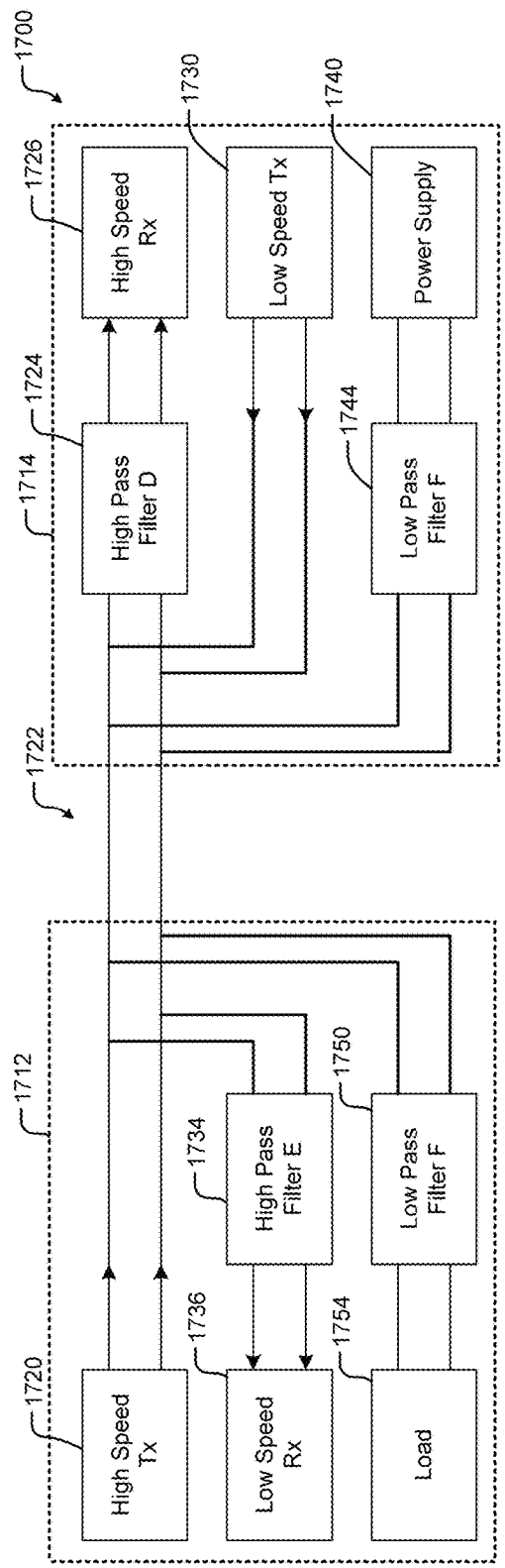

Referring now to FIGS. 16 and 17, power can be supplied via the medium. When injecting power, additional filtering is required. In FIG. 16, the filtering is consistent with that described in the second approach described above. A communication system 1600 includes link partners 1612 and 1614 connected by immediate 1622. The first link partner 1612 includes a high-speed transmitter 1620 that outputs data to a high pass filter A 1624 and a high-speed receiver 1626 of the link partner 1614. A low-speed transmitter 1630 of the link partner 1614 outputs data over the medium 1622 to a bandpass filter B 1634 and a low-speed receiver 1636. Power is supplied by the link partner 1614 using a power supply 1640 and a low pass filter C 1644 connected to the medium 1622, A load 1654 at the link partner 1612 receives power from the medium 1622 via the low-pass filter C 1650.

In FIG. 17, the filtering is performed according to the present disclosure. A communication system 1700 includes link partners 1712 and 1714 connected by a medium 1722. The first link partner 1712 includes a high-speed transmitter 1720 that outputs data to a high pass filter D 1724 and a high-speed receiver 1726 of the link partner 1714. A low-speed transmitter 1730 of the link partner 1714 outputs data over the medium 1722 to a high pass filter E 1734 and a low-speed receiver 1736. Power is supplied by the link partner 1714 using a power supply 1740 and a low pass filter F 1744 connected to the medium 1722, A load 1754 at the link partner 1712 receives power from the medium 1722 via the low-pass filter F 1750. Note that filters D and E can be omitted if power delivery is not required.

Filters A and D operate at the high speed frequency band. However filter A requires a sharp lower frequency cutoff to block out the low speed Tx signal while not blocking out the high speed Tx signal. Filter D on the other hand can have a more relaxed and less accurate cutoff frequency since the only thing it needs to block is the low frequency noise from the power supply 1740. A filter with sharper cutoff is more expensive to implement.

Filters B and E have similar issues as filters A and D except that the upper frequency cutoff of filter B has to be sharp to block the high speed Tx signal while not blocking out the low speed Tx signal. There are no restrictions on the upper end for filter E since it is a high pass filter and not a bandpass filter.

Since the operating frequency of the low speed signal via filter B (i.e. 100 MHz) is much lower than through filter E (i.e. 2000 MHz), the lower cutoff frequency of filter B is much lower than filter E. As a result filter B is physically bigger and more expensive than filter E.

A low pass cutoff frequency of filter C is at a lower frequency (relative to filter F) since the power supply noise should not leak into an operating frequency range of the low speed receiver. While the filter C can be used to replace filter F, designing filter F to have a higher cutoff frequency results in a smaller and less expensive filter.

Note that in the examples, there Is no echo cancellation. Also, because of the lower requirements on the low speed path (slower, 2 levels, no FEC), the system is less expensive to implement relative to systems using the same high speed components for both. The FIFO buffers temporarily buffer the continuous data streams since the signaling on the line is stop and go.

In summary, the complexities of echo cancellation can be removed when the transmission alternates between 2 PHYs and alternating transmission are delayed by a duration greater than ½ the worst case echo reflection time. The complexity of the lower speed path can be reduced by running the slower path at a lower speed and/or with fewer signal levels. The FEC can be removed on the slower path as the signal to noise ratio is higher. In addition, less expensive power supply filtering can be used.

The power supply filters typically include different combinations of inductors, capacitors and/or resistors. The inductors tend to be the most expensive portion of the power supply filters. In one of the examples set forth above, Rb=100 Mb/s and Rlb=2245 Mb/s, which is a 22× difference in speed, $t_{droop}$ is a filter performance factor that power supply filters specify on a per symbol basis. When $t_{droop}$ is too high, the signal can be lost. $t_{droop}$ is influenced by sizes of inductors in the filters that are used. For a given level of $t_{droop}$ specified for a power supply filter in a given application, some of the power supply filters used in the present disclosure can allow $t_{droop}$ to be up to 22 times shorter. As a result, inductors in some of the power supply filters can be smaller and therefore less expensive. In some examples, the inductors in the power supply filter will be more than 50% less expensive, which reduces the cost of the PHYs.

As can be appreciated, the transmitter and receivers of each link partner can be implemented by a single integrated circuit or more than one integrated circuit.

When tunneling data from a first protocol using a second protocol, it is advantageous to pack data from the first protocol into fixed size frames of the second protocol that is used for the tunneling. In this example, the first protocol is referred to herein as the source protocol and the protocol used to tunnel is referred to herein as the tunneling protocol. Examples of source protocols can be mobile industry processing interface (MIPI) camera serial interface (CSI)-2, inter-integrated circuit (I²C), Ethernet, Display Port, or other suitable protocols.

Typically, the source protocols are presented as groups of data packed into source frames. Depending on the protocol, the frame size can be very big as in the case of video data on MIPI CSI-2, or very small such as I²C commands, or something in between such as in Ethernet frames.

Figure 18:
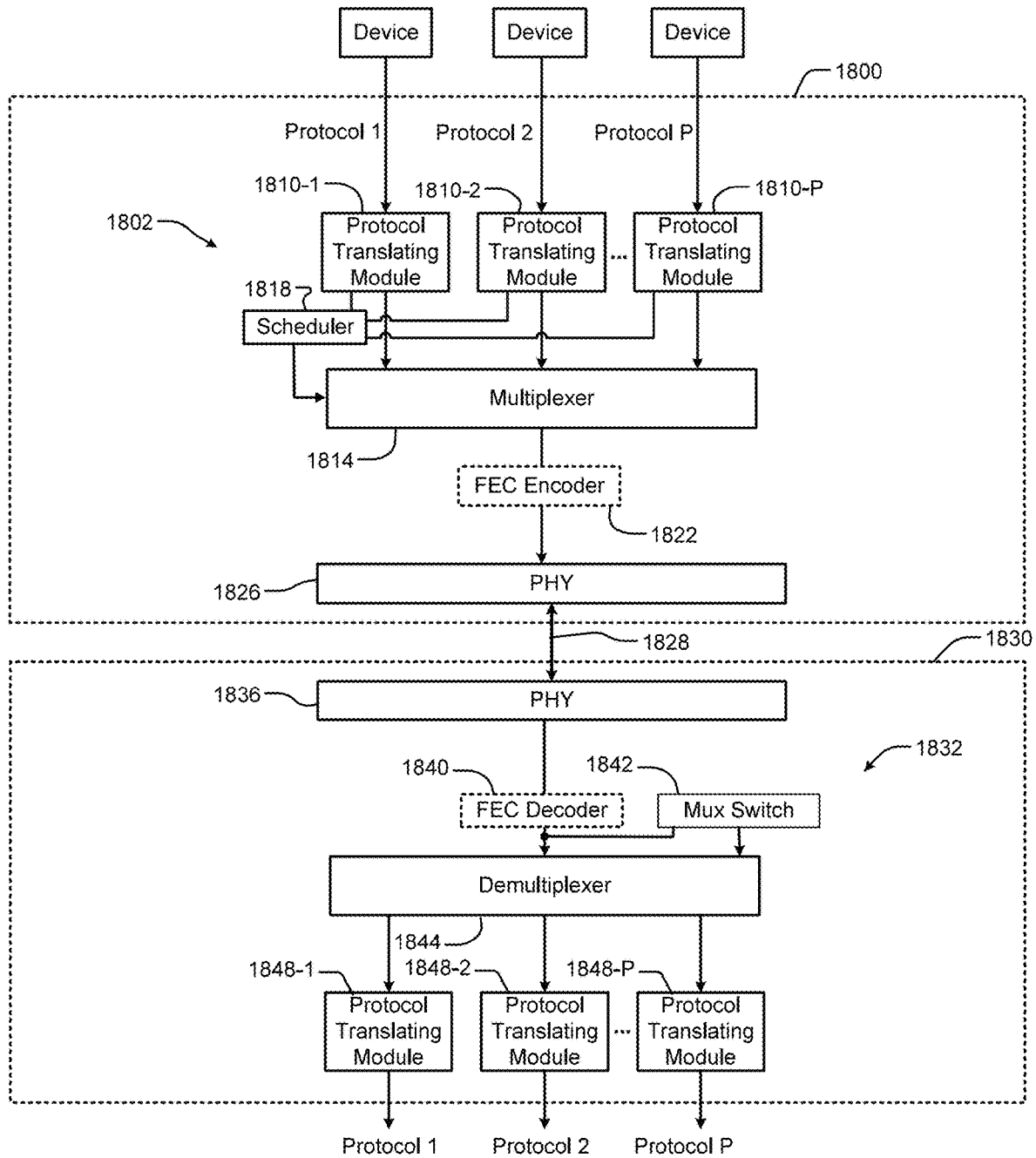
FIG. 18 is a functional block diagram of an example of an interface for an asymmetric channel that receives source frames from a plurality of devices using one or more source protocols and converting to a tunneling protocol according to the present disclosure.

Referring now to FIG. 18, a wired interface 1800 for an asymmetric wired channel receives source frames from one or more devices using one or more source protocols (e.g. protocols 1, 2, . . . , and P, where P is an integer greater than one). The interface 1800 includes a link layer device 1802 that converts the source frames to a tunneling protocol and a physical layer device (PHY) 1826 that provides an interface to a wired medium 1828.

The link layer device 1802 includes one or more protocol translating modules 1810-1, 1810-2, . . . , and 1810-P, where P is an integer greater than zero (collectively protocol translating modules 1810). The protocol translating modules 1810 translate various source protocols into the tunneling protocol. Typically the protocol translating modules 1810 slice the source frames into one or more fixed size frames selected from f fixed size frames (where f is an integer greater than one) and appends headers and/or trailers to the fixed sized frames. In some examples, the f fixed sized frames have a payload that is an integer multiple of a payload of a smallest one of the f fixed sized frames.

Outputs of the protocol translating modules 1810 are input to ports of a multiplexer 1814. A scheduler 1818 communicates with the protocol translating modules 1810 and/or the devices. The scheduler 1818 schedules transmission over the medium 1828 by selecting one of the input ports of the multiplexer 1814 as will be described further below. The fixed sized frames from the multiplexer 1814 are then transmitted by the scheduler 1818 according to a transmit schedule defined by the scheduler 1818. An optional forward error correction (FEC) encoder 1822 encodes an output of the multiplexer 1814 using FEC. In some examples, FEC is applied to higher data rates (such as ≥10 Gb/s) and not applied at lower data rates (such as ≤10 Gb/s), although another data rate threshold may be used. A physical layer device 1826 receives an output of the FEC encoder 1822 and outputs data onto a medium 1828.

A wired interface 1830 of a link partner also includes a PHY device 1836 providing an interface to the medium 1828 and a link layer 1832 that translates the tunneling protocol to the source protocols. The PHY device 1836 of the link partner 1830 receives the data from the medium 1828 and outputs the data to a FEC decoder 1840. An output of the FEC decoder 1840 is input to a demultiplexer 1844 and a multiplexer switch 1842. The multiplexer switch 1842 reads the headers and/or trailers and controls the demultiplexer 1844 based on data in the headers and/or trailers. Protocol translating modules 1848-1, 1848-2, . . . , and 1848-P (where P is an integer greater than one) (collectively protocol translating modules 1848) receive an output of the demultiplexer 1844. The protocol translating modules 1848 strip the headers and trailers and reassemble the one or more fixed sized frames into the source frames of the source protocols.

Note that to simplify FIG. 18, data is shown traversing in one direction. However, there may or may not be traffic transmitted in the reverse direction as well. For example, the protocol translator for MIPI CSI-2 for a camera is only used in the downstream direction. For Ethernet and I²C, the protocol translator is bi-directional. The rates in each direction may be symmetric or asymmetric. While protocols 1, 2, . . . , and P are shown, each of the protocols can be unique or one or more of the protocols can be the same. For example, the devices may include two cameras using the same protocol.

In some examples, the opposite direction has a parallel structure. However, the opposite direction is not necessarily a 1:1 copy since there is a fast path in one direction (from top to bottom in FIG. 18) and a slow path in another direction (not shown).

For example, the PHY to PHY connections as previously disclosed will typically have one direction having much higher bandwidth as compared to the opposite direction. In other words, on the device side, there will be a faster transmitter and a slower receiver while on the ECU side (e.g. bottom of page in FIG. 18), there will be a faster receiver and a slower transmitter.

The PHYs take turns transmitting on the medium. In some examples, time on the medium may be allocated to the PHYs based on a ratio. For example let's assume the dead time is 1% each. One direction of traffic can be allocated 97%, 1% allocated to dead time, 1% can be allocated to the opposite direction, 1% can be allocated to dead time (or 97/1/1/1). However, in other examples, the allocation can be 80/1/18/1, 49/1/49/1 or even in the other direction 10/1/88/1.

Referring now to FIG. 19, a more detailed functional block diagram of one of the protocol translating modules 1810 is shown. The protocol translating module 1810 includes a slicing module 1910 to slice the source frames into the one or more fixed sized frames. The protocol translating module 1810 further includes a header/trailer adding module 1914 to add headers and/or trailers to the fixed sized frames. The protocol translating module 1810 may include a buffer 1918 to temporarily store the fixed sized frames until they are scheduled for transmission over the medium, Alternately, the multiplexer 1814 may include a buffer 1922 to temporarily store the fixed sized frames until they are scheduled for transmission over the medium.

Referring now to FIG. 20, a source frame 2010 is sliced by the slicing module 1910 into one or more fixed size frames 2014-1, 2014-2, . . . , and 2014-F, where F is an integer greater than zero (collectively fixed size frames 2014). In this example, F=6 and the fixed sized frames that are selected have the same payload. However in some examples, the source frames may be sliced into two or more fixed size frames having different payloads. The header/trailer adding module 1914 adds headers and/or trailers to the fixed size frames. A last one of the fixed sized frames 2014-F may include unused data 2020.

Figures 21, 22, 23:
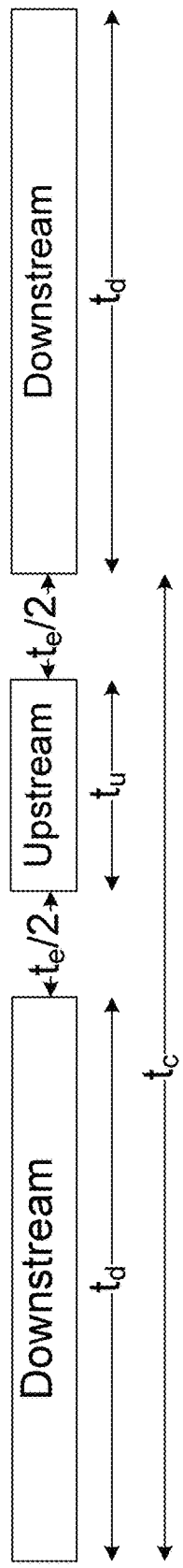
FIG. 21 illustrates an example of a frame of the tunneling protocol according to the present disclosure.
FIG. 22 is a diagram illustrating an example of downstream and upstream transmission delays according to the present disclosure.
FIG. 23 is a table illustrating various example parameters for a four protocol tunneling interface.

Referring now to FIG. 21, one of the fixed sized frames of the tunneling protocol is shown. The header typically specifies start and end points of the fixed size frame, a length of valid data in the fixed size frame, a type of fixed size frame, and/or other control information. In some examples, the trailer includes error correcting data such as cyclic redundancy check (CRC) or another checksum to allow detection of bit errors in the frame after transmission.

To improve efficiency and reduce overhead, the number of bytes added by the header and trailer should be minimized. High efficiency can be achieved if the fixed size frame carries a large payload as compared to a smaller payload. Unfortunately, as mentioned earlier, some source protocols can have a frame size that is very small. If a frame of large payload is used in the tunneling protocol, many bytes in the payload will not contain useful information.

One way to strike a balance is to have several fixed sized frames each with differing fixed lengths. While any set of lengths can work, the implementation and scheduling becomes easier when the fixed length frame sizes are integer multiples of each other and/or when the payload sizes are integer multiple of each other.

For example, 8 bytes can be used for the header and trailer and 16, 64, or 640 bytes can be used for the payload. This will result in fixed frame sizes of 24, 72, and 648 bytes. In other words in this example, 64/16=4, 640/64=10, 640/16=40 for payload sizes and 72/24=3, 648/72=9, and 648/24=27 for fixed frame sizes. The scheduler in this example can be simplified by having n×27 slots for each cycle where each slot is 24 bytes. As each frame comes in, it will occupy either 1, 3, or 27 slots. As a result of this arrangement, there will not be any fractional slots. In contrast, if payloads of 16, 128, 1024 are used with 8 bytes of header/trailer data, frame sizes of 24, 136, and 1032 are used. Then, 136/24=5.666, 1032/136=7.588, and 1032/24=43, which makes transmission less efficient.

A similar approach can be used when forward error correction (FEC) is used. Continuing with the example above with 24, 72 and 648 frame sizes, a Reed Solomon (RS) code with (n, 216) with 8-bit symbols is used where 218<=n<=255. In this example, a 648-byte frame can be split evenly into three frames with 216 bytes and placed into three RS frames. Three 72-byte frames can be placed into one RS frame, and nine 24-byte frames can be placed into one RS frame.

To generalize the foregoing, there are f different frame sizes 1, 2, . . . , and f with the header and trailer of h bytes. The bytes of payload $p_1<p_2<\ldots<p_f$ of the f different frame sizes are selected to satisfy the following 2 conditions:

$p_{i+1}/p_i$=integer for all $i=1$ to $f-1$; and $(h+p_{i+1})/(h+p_i)$=integer for all $i=1$ to $f-1$, For 8 bit symbol RS code of (n, k), either $[8\times(h+p_i)]/[k\times b]$ is an integer or $[k\times b]/[8\times(h+p_i)]$ is an integer for all i=1 to f. RS code restricts $2^b>n>k$.

Referring now to FIG. 22, selecting good frame sizes for the tunneling protocol is beneficial when transmitting data asymmetrically. Downstream and upstream data are transmitted asymmetrically where the downstream data rate is greater than or equal to the upstream data rate. The durations are $t_d$ and $t_u$, respectively. The downstream and upstream transmit periods are separated by $t_e/2$ for echo suppression. $t_c$ is the time to complete one cycle, To simplify the discussion, the propagation delay is ignored and the gap between downstream to upstream and upstream to downstream is assumed to be equal. This simplification does not alter the following analysis.

Referring now to FIG. 23, an example of parameters for asymmetrical channels operating at 4 different speeds is shown. In some examples, the $t_c$ cycle time is identical for all rates. This can be done using an integer number of fixed size frames and tweaking $t_e$.

The line rate is the actual raw bit rates being transmitted on the wire. Note that the number of transmitted levels used (i.e. PAM2 vs PAM4) is not important since we are only concerned about the effective line rate. (i.e. for 16000 Mbit/s can be achieved by PAM2 at 16000 Mbaud or PAM4 at 8000 Mbaud.) The data rate is the required data rate of the source protocol. In other words, the data rate is for the payload (not including the header/trailer). As described above, higher speeds may require the use of FEC.

Continuing with the example above with frame sizes of 24, 72, and 648 bytes including the 8 byte header/trailer. A RS FEC (n, k) code is selected with n/k reducing to r/q where q and r are small integers. Using RS(243, 216, 28), we have n/k=243/216=9/8. In this example, the downstream path uses the small, medium, and large fixed frames while the upstream path is limited to small and medium frames. For the purposes of computing the overhead for the downstream and upstream data rates, the most efficient frame size is used.

For example for the 4000 Mbit/s line rate, a 3600 Mbit/s data rate will require 3600×648/640=3645 Mbit/s line bandwidth to transmit. In the case of 12000 Mbit/s line rate, a 10000 Mbit/s data rate will require 10000×648/640×9/8=11390.625 Mbit/s. For the upstream at 2000 Mbit/s line rate at 120 Mbit/s data rate will require 120×72/64=135 Mbit/s.

An integer number of fixed frames (for example, 9, 18, 25, and 33 of the 640 byte payload are used for downstream and 3 of the 64 byte payload are used for upstream) prevents fractional frames per cycle. Identical cycle time ($t_c$) across different speed grades simplifies the multiplexing and demultiplexing since an integer number of slots will be multiplexed and de-multiplexed over a fixed period.

Figure 24:
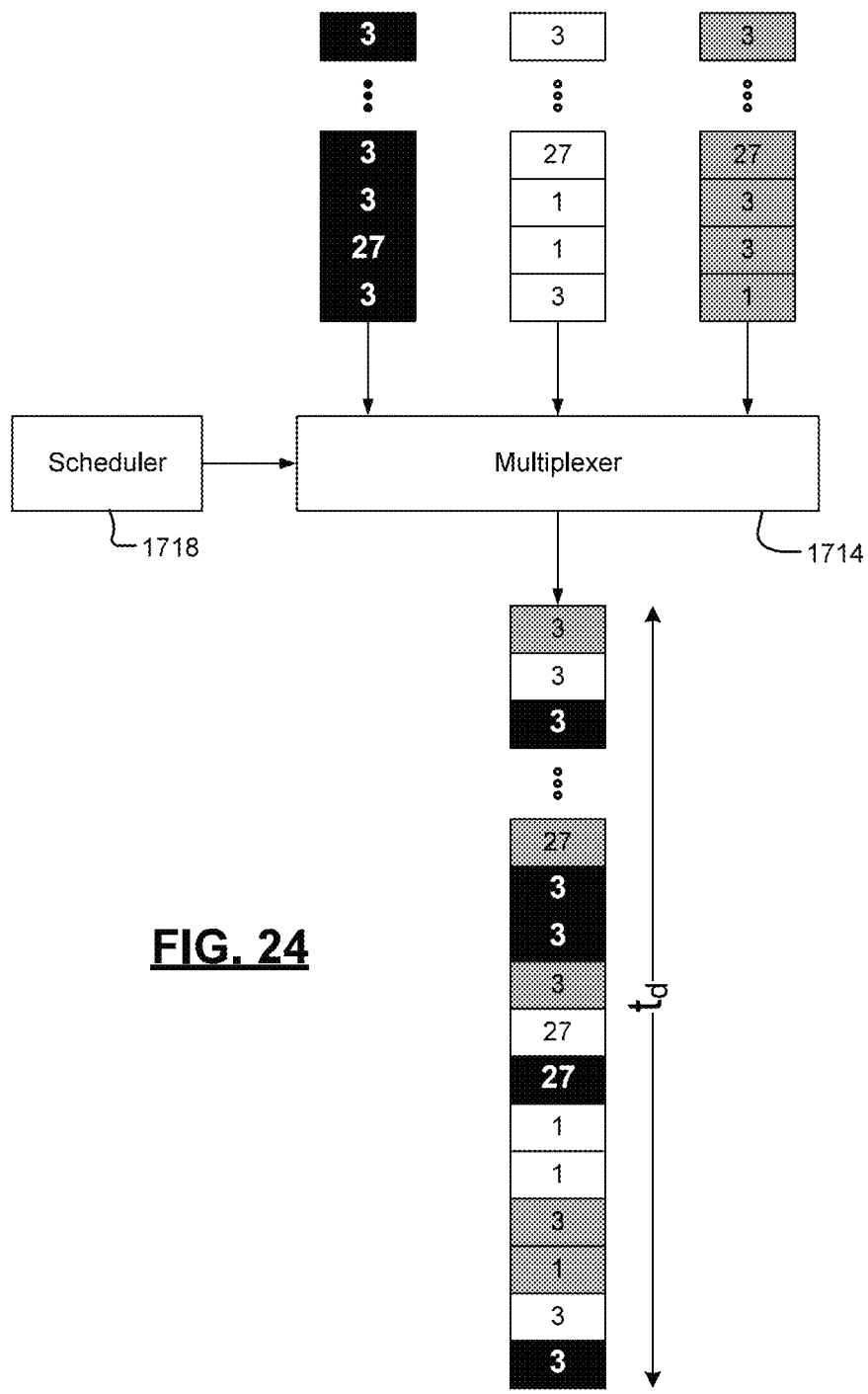
FIG. 24 illustrates an example of protocol translation from one of the source protocols to the tunneling protocol according to the present disclosure.

Referring now to FIG. 24, an example of scheduling of data from 3 data sources is shown. The numbers in each box denote the number of slots taken by each of the fixed size frames.

Referring now to FIG. 25, in the example given above there are 3 types of frames—short, medium, and long. Since the frame sizes are fixed and the payload may not use of all the payload bytes in the frame, a valid length indicator may be used in the header to identify valid data in the payload bytes. In addition to specifying the length, the field can indicate special frames that are used to communicate control and status across the link.

There is a distinction between the transmission rate and the amount of data that is sent across the medium. Many of the examples set forth above involve transmitting downstream at a higher raw bit rate and for a longer duration as compared to the raw bit rate and transmit duration in the opposite direction. For example, both sides may transmit at the same raw bit rate but asymmetry is achieved when once side transmits for a longer portion of each cycle than the link partner transmits data in the opposite direction.

Several advantages of the asymmetrical PHY are already discussed above. Communication between PHY A to PHY B and vice versa is separated by a predetermined period that is sufficient to eliminate the need for an echo canceller. The predetermined period is greater than or equal to a quiet period $t_e/2$ where $t_e$ corresponds to the period for a signal to reach the far end of the cable and reflect back. In the discussion set forth below, a training system according to the present disclosure calculates optimal transmission separation for the PHY and a link partner PHY.

Figure 26:
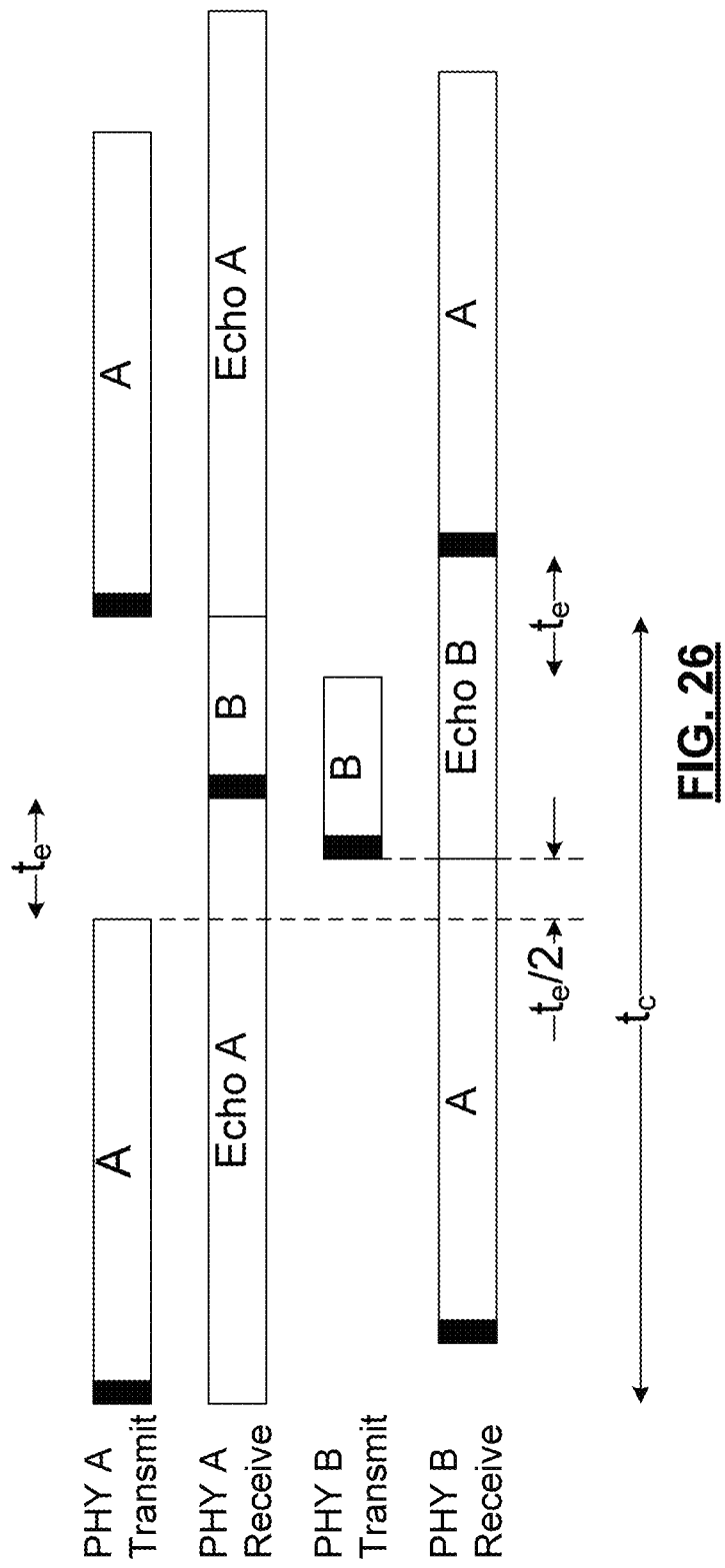
FIG. 26 is an example of a timing diagram of alternating transmit bursts from a master PHY and a slave PHY according to the present disclosure.
Figure 27:
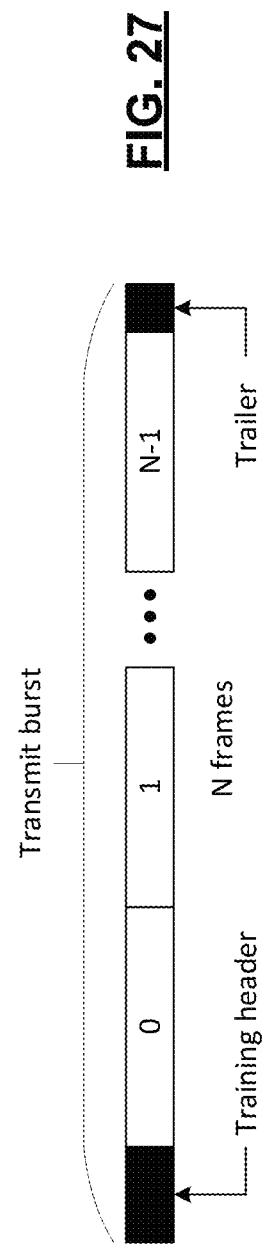
FIG. 27 illustrates an example of a frame format of a transmit burst including a training header, frames and an optional trailer according to the present disclosure.

Referring now to FIGS. 26 and 27, a full transmit cycle $t_c$ refers to a period for the master PHY and the slave PHY to transmit plus the two quiet periods that separate them. For the purposes of the following discussion, the transmit cycle always starts at the beginning of a transmit burst from the master PHY. Transmit burst refers to data sent by the master PHY and the slave PHY during each full transmit cycle. The master PHY and the slave PHY alternate transmitting transmit bursts. In FIG. 27 each transmit burst includes a training header and multiple frames (either training or data) and may or may not contain a trailer.

A quiet period refers to a period that is silent between transmit bursts. A training header refers to a short known sequence of bits transmitted at the start of a transmit burst. The known sequence allows the receiver to adjust internal settings before data is received. Note that the sequence is known a-priori but this does not necessarily mean that the training header is a fixed pattern. Some control information may optionally be inserted into the training header.

Data Frame refers to data that is transmitted in a frame during normal operation after training is completed. Multiple data frames are packed into a transmit burst. Training frame refers to control/status bits transmitted in a frame during training. Multiple training frames are packed into a transmit burst. Trailer refers to an optional ending sequence. Some control information may optionally be inserted in the trailer. Symbol period refers to a period for transmitting one symbol on the wire. Note that the symbol period will be different if PHY A and PHY B are running at different speeds. Also note that the quiet period can be measured in terms of symbol periods even if no data is being transmitted.

In some examples, the frame size is identical in each direction (though not necessarily the same size for both directions). There are integer number of frames in each transmit burst. For a given operational mode (i.e. speed) there are the same number of frames in each transmit burst.

Note that these constraints are not necessary for systems and methods described herein to work properly. However, by making the parameters fixed, there is no need to track the variability and the discussion is simplified. For example, some control data can be embedded in each transmit burst to identify the number of frames in the transmit burst. Control data may also be embedded in each frame to identify its length.

As described above in conjunction with FIG. 9, a master clock can be distributed such that all of the data rates in the system are synchronized to a frequency of the master clock. In the following description, other methods are described for synchronizing data to the frequency of the master clock without physically distributing the master clock.

As described above, the transmitters and receivers are referred to as high speed or low speed. Generally the high speed transmitter/receiver is exchanging data for a longer duration than the low speed transmitter/receiver. However there is nothing precluding both directions from operating at the same speed, or even the higher speed active for a shorter period though in this latter case the bandwidth is not being efficiently used (except during training as will be described later).

So given the above, instead of using fast and slow, the transmitter/receiver that is active longer during normal operation (as opposed to training mode) is the downstream transmitter/receiver and the transmitter/receiver in the other direction is the upstream transmitter/receiver. The downstream direction is the direction of data flow from the downstream transmitter/receiver, and similarly the upstream direction is the direction of data flow from the upstream transmitter/receiver. The general configuration will be that the fast transmitter/receiver will operate in the downstream direction and the slow transmitter/receiver will operate in the upstream direction.

In the description above, loop timing is used. The master PHY transmits data based on a its local clock and the slave PHY recovers the clock. The slave PHY transmits its data based on some multiple of the recovered clock. In FIGS. 14 and 15, all 4 combinations of master/slave and downstream/upstream are shown. For example in FIG. 14, the PHY on the left is a master transmitter transmitting in the upstream direction. In other words, the master/slave and downstream/upstream parameters are independent parameters and interdependent.

If there is no loop timing, then there is no concept of the master PHY or the slave PHY and both PHYs will transmit based on the corresponding local clock. In systems described below, loop timing is used. Each of these systems can operate without loop timing. However, operating without loop timing is less robust.

As described above, PHY A and PHY B transmit their respective data over a full transmit cycle of duration $t_c$. With loop timing, the number of symbol periods over the period $t_c$ is a constant integer relationship. The local clock can drift slightly faster or slower with temperature, clock aging, or other reasons. The timing relationship between the two PHYs will self-compensate because the slave PHY is always tracking the clock of the master PHY. If loop timing is not used, then the master PHY and the slave PHY will need some mechanism to compensate for the frequency difference.

For example for simplicity, assume that both PHYs transmit at the same symbol rate (note that this example will still apply if one side is transmitting N times faster or slower than the other), PHY A is transmitting 10 parts per million (ppm) faster than PHY B. In other words, when 1,000,000 symbol periods elapse in PHY B, PHY A will have 1,000,010 symbol periods elapse. The difference will quickly accumulate and will result in transmit bursts from PHY A overlapping with transmit bursts from PHY B unless adjustments are made.

For example, the quiet period $t_e/2$ can be periodically adjusted by adding or deleting a few cycles. Alternately, the local clock of the master PHY can be induced to speed up or slow down. In order to perform either of these adjustments, one PHY will have to communicate to the other PHY that an adjustment is being made.

In FIG. 26, each transmission burst is preceded by a training header as depicted in black. The training header includes a training pattern that is a known sequence to allow the receiver to briefly retrain before receiving data. The training header is required regardless of whether loop timing is used or not. If loop timing is not used, the training header can also be used to determine when data starts. In the example above, assuming that PHY A wants to match the rate of PHY B, then PHY A can delay its transmit burst by 10 symbol periods after 1,000,000 symbol periods elapse to account for the fact that it is transmitting slightly faster than PHY B. PHY B will see the training header 10 symbol periods later and start the data recovery later.

In a noisy environment, this method of adjustment is not robust because the exact time that data will arrive is not predictable. The receiver is dependent on receiving the training header to determine the start of data. It is possible that most if not all of the training header is corrupted by burst noise from time to time.

In a system with loop timing where periodic adjustments for clock differences are not required, the start of data is predictable by counting the symbol times (clock cycles) that elapse. Even if the training header is corrupted by noise, the receiver does not need the information to determine the start of data. Note that if data is corrupted by noise, it can be recovered by forward error correction (FEC). However FEC cannot work if the receiver does not know exactly when the data starts. So without loop timing, corruption to the training header can result in loss of the entire transmission burst.

In the examples set forth below, loop timing is used to provide a more robust system. Also, using fixed frame lengths and a fixed number of frames in a transmit burst will also make the system more robust since no control data needs to be transferred that may be subject to corruption by noise.

Referring now to FIG. 28, examples of upstream and downstream transmit parameters are shown. The discussion of PHY training can be made more concrete by using specific numbers instead of abstract variables. However, the present disclosure is not limited to using only these specific parameters. Note that the speeds with the downstream frame size of 240 bytes use stronger FEC (more parity bytes) as compared to the 216 byte frame.

For example, a 16000 Mb/s raw bit rate will be used as an example since it is the most complicated case with PAM 4. As discussed earlier, the example also assumes that loop timing is used. Before the PHYs can exchange data, the receivers need to adapt (train) their internal filters and timing loops in order to receive data reliably. Since the PHYs take turns exchanging data, they also need to coordinate the corresponding transmit and receive periods. In the example, the downstream transmit burst occupies about 95% of the full transmit cycle while the upstream transmit burst occupies about 3% during normal operation. The training of the upstream receiver will take a long time since it sees data in only 3% of the full transmit cycle. Furthermore, if the upstream transmitter is the master PHY, it will take the slave PHY a long time to acquire frequency lock with the master PHY. Also during startup, the two PHYs need to establish the timing relationship between when the upstream and downstream transmission bursts occur.

Referring now to FIGS. 29 and 30, the training sequence described below enables quick startup by not limiting the upstream transmit burst to occupy only 3% of the full transmit cycle during training and allows the upstream and downstream transmit bursts to be coordinated early on in the training process. The training sequence that is used depends on whether the master transmitter is an upstream transmitter or a downstream transmitter. The shaded bars indicate master transmitting and the unshaded bars indicate slave transmitting. The black areas correspond to the training headers or trailers. The master and slave PHYs progress from the top row to the bottom row. The states of the master PHY are listed on the left and the states of the slave PHY are listed on the right.

It is advantageous to perform training using PAM 2 modulation instead of a higher level modulation that may be used in normal operation since the wider separation of the signal is more immune to noise. In this example, PAM2 modulation is used during training even though there is no strict requirement to do so and normal operation is in PAM4 in the downstream direction. In principle, the training can be done in PAM4 without affecting the training sequence.

Various periods are shown in FIGS. 29 and 30.

$t_C$=Full transmit cycle period
$t_D$=Downstream transmit burst period
$t_U$=Upstream transmit burst period
$t_e$=round trip echo for worst case cable supported (not shown in the diagrams)
$t_Q$=50% of the total quiet period in a full transmit cycle. $2t_Q \geq t_e$
$t_X$=Initial quiet period from the end of the master transmit burst to the start of the slave transmit burst
$t_Y$=Initial quiet period from the end of the slave transmit burst to the start of the master transmit burst Note that $2t_Q=t_X+t_Y$.

Training frames are embedded in the transmit bursts. As will be described below, the training frames allow the master PHY and the slave PHY to exchange local status data with each other so that the training sequence can progress.

Figure 31:
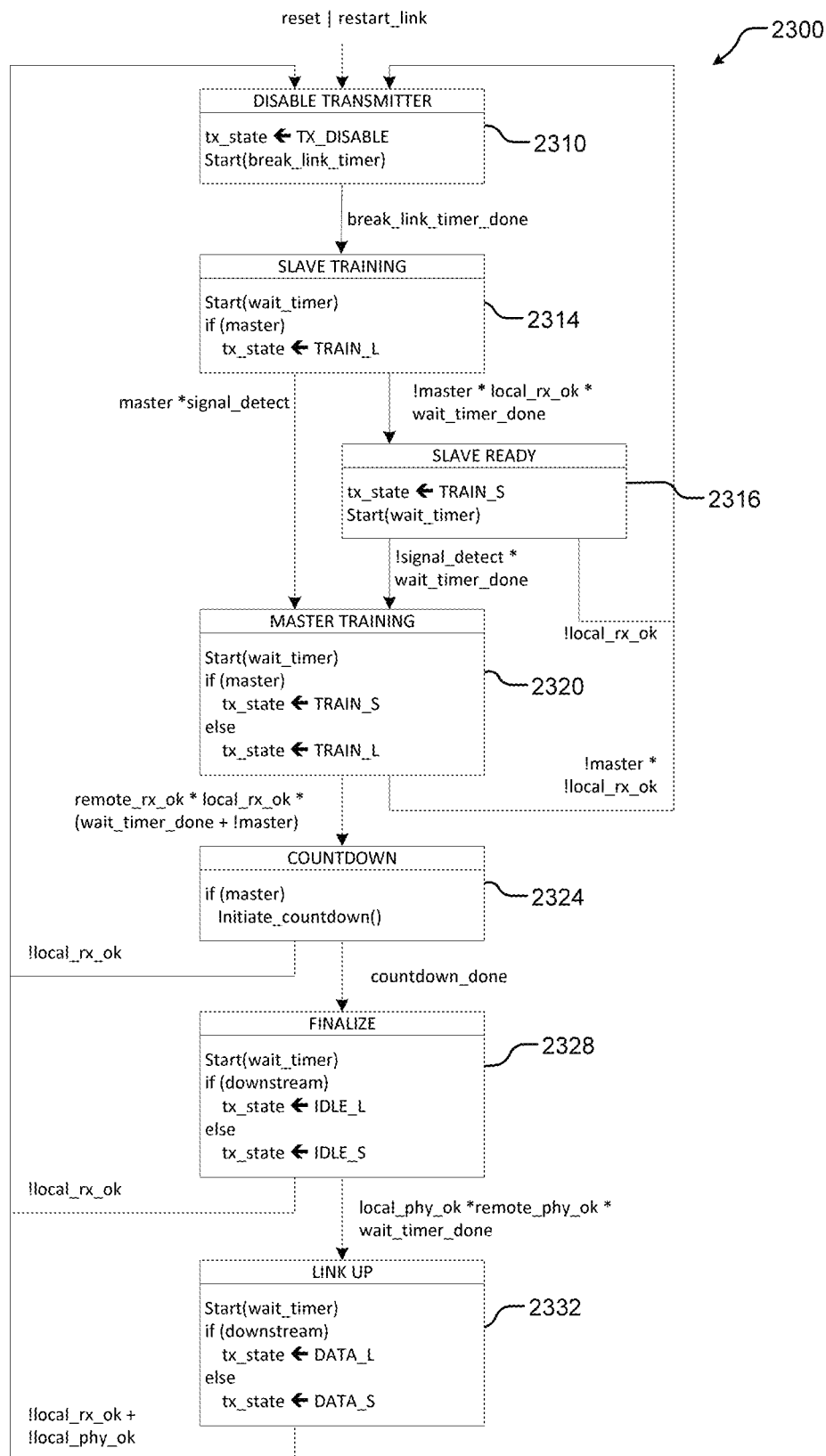
FIG. 31 is a state diagram of an example of a training mode according to the present disclosure.

Referring now to FIG. 31, a state diagram 2300 is shown. Both PHYs start in a DISABLE TRANSMITTER state 2310 with their transmitters disabled for a specific duration so that the link partner can detect a break in transmission and restart the training sequence if it has not already restarted. The training sequence proceeds to a SLAVE TRAINING state 2314. The master PHY transmits training frames for a duration of $t_D$. This is true even if the master PHY is operating as an upstream transmitter where in normal operation, the transmit burst sent is only for a duration of $t_U$.

In the previous example, this occupies 95% of the bandwidth which gives the slave PHY adequate transmit burst duration to adapt its internal filters and timing loop and acquire frequency lock to the master PHY. The gap in transmission also allows the slave PHY to align its transmit burst to the transmit burst of the master PHY. This delay by default is $t_X$ which is the optimal delay for the maximum length cable. However, if the cable is not maximum length, a delay of $t_X$ will not optimize the spacing between the two transmit bursts.

Once the slave PHY locks onto the transmit burst of the master PHY (local_rx_ok=1), the slave PHY should be able recover the training frames and receive the status of the master internal state. The slave PHY then starts to transmit a training frame of duration $t_U$ to indicate to the master PHY that it successfully locked onto the master transmit data (a SLAVE READY state 2316). Since the receiver of the master PHY has not adapted to the transmitter of the slave PHY, the only way to determine that the slave PHY is locked is by sensing a signal (signal_detect=1) during the gap between the transmit bursts of the master PHY. Even though the master PHY cannot properly recover the training frame data of the slave PHY, the slave PHY will nonetheless send a training frame with a bit set indicating that it is locked.

Once the master PHY detects that the slave PHY is transmitting, it shortens its transmit burst to a duration of $t_U$ (a MASTER TRAINING state 2320). Once the slave detects the absence of a signal for a full duration $t_D$ (signal_detect=0), the slave PHY knows that it can extend its transmit burst to a period of $t_D$ (the MASTER TRAINING state 2320). The master PHY can now adapt its internal filters and timing loop to lock onto the transmitted data from the slave PHY. Note that during this time, the slave PHY is still using the master transmit burst of $t_U$ to adapt its filters and timing loops. If this is not done, the slave PHY will eventually lose lock.

Once the master PHY is locked to the transmit bursts from the slave PHY (local_rx_ok=1) (and optionally computes the optimal quiet time duration), the master PHY sets a bit in the training frames that it sends to the slave PHY indicating the locked condition. The slave PHY receives the set bit and knows that the master is locked (remote_rx_ok=1). When both the master PHY and the slave PHY indicate they are locked, the PHYs will enter into a phase where they synchronize their entry into normal operating mode (a COUNTDOWN state 2324).

The master PHY initialized the synchronization by indicating how many full transmit cycles elapsed from the current full transmit cycle before both the master PHY and the slave PHY transition to the normal operating mode. The master PHY will optionally indicate to the slave PHY how much additional delay is needed to optimally separate the transmit bursts, Once this point is reached (countdown_done) both PHYs enter the normal operating mode (a FINALIZE state 2328).

Up to this point the sequencing is identical regardless of whether the master PHY is operating as the upstream transmitter or the downstream transmitter. If the master PHY is operating as downstream transmitter, the transmit burst from the master PHY will revert to a duration of $t_D$ and the slave PHY to a duration of $t_U$. Data frames will be transmitted instead of transmit frames. The modulation changes from PAM2 to the modulation level used during normal operation. Optionally, the slave PHY delays its transmit burst so that the spacing is closer to the optimal $t_O$ instead of being at $t_X$. During this time, only data frames containing zero bytes of valid data are transmitted in the data frame. This gives the master PHY and the slave PHY some time to perform final adjustments before exchanging data.

Once all of the adjustments are done (local_phy_ok=1), the master PHY and the slave PHY transition into normal operation (a LINK UP state 2332). If the protocols have the ability for the master PHY and the slave PHY to exchange status information with each other (remote_phy_ok=1) the transition occurs only when both the master PHY and the slave PHY are ready to transition (i.e. local_phy_ok*remote_phy_ok). If this ability does not exist, then a timer can be used instead (i.e. local_phy_ok*long_wait_timer_done). In the state diagram in FIG. 31, there is an ability to exchange data and a wait timer (local_phy_ok*remote_phy_ok*wait_timer_done) can be used.

Variables that are used in the state diagram are defined as follows:
downstream: Down/Upstream transmitter. 1=Downstream, 0=Upstream
local_phy_ok: PHY receiver locked. 1=locked, 0=not locked
local_rx_ok: Clock/data recovery locked. 1=locked, 0=not locked
master: Master/Slave. 1=master, 0=slave
remote_phy_ok: Link partner PHY receiver locked. 1=locked, 0=not locked
remote_rx_ok: Link partner clock/data recovery locked. 1=locked, 0=not locked
reset: Reset state diagram. 1=reset, 0=normal operation
restart_link: Force restart. 1=restart, 0=normal operation
signal_detect: Receive signal detected during expected time in full transmit cycle. 1=signal detected, 0=signal not detected
tx_state: State of the transmitter.
TX_DISABLE disable transmitter
TRAIN_L transmit burst of $t_D$ duration containing training frames
TRAIN_S transmit burst of $t_U$ duration containing training frames
IDLE_L downstream transmit burst containing data frames of zero valid bytes
IDLE_S upstream transmit burst containing data frames of zero valid bytes
DATA_L downstream transmit burst contain data frames
DATA_S upstream transmit burst contain data frames A timer used in the state diagram includes a break_link_timer corresponding to a period to break link. In some examples, the break link period is equivalent to 16 full transmit cycles, Another timer used in the state diagram includes a wait_timer corresponding to a wait timer period. In some examples, the wait timer period is equivalent to 4 full transmit cycles.

Training frames are used to exchange control and status information between the master PHY and the slave PHY during the training sequence. Since data recovery is not fully reliable during training, the training frames are repeated multiple times and the system is not dependent on receiving every training frame correctly.

The basic requirements for a training frame include providing a way for the receiver to determine the training frame boundaries, exchanging control and status information between PHYs, and a form of checksum to ensure corrupted training frames are ignored. In other examples, the training frame can include other data relating to scrambler seed recovery.

Referring now to FIG. 32, a table shows examples of values in various fields in a training frame. The training frame described in the table includes 54 bytes. This number is chosen since the upstream data frame size is 54 bytes in the example and making them the same allows some circuits to be reused. However, the training frame can be made any size in practice.

The first 36 bytes are all zeros followed by a fixed pattern in bytes 36 and 37. The fixed pattern allows the training frame boundary to be determined since nowhere else will 36 bytes of 0s be followed by the fixed pattern. Byte 38 bit 0 is always 1 to ensure that not all bits are 0s in the portion protected by the parity so that the parity itself will not be all 0s. Byte 38 bit 1 indicates whether the clock and data recovery circuits of the corresponding PHY are locked. This corresponds to the local_rx_ok variable of the PHY when transmitted and the remote_rx_ok at the link partner when received. As will be described below, byte 38 bit 2 indicates the leader and the follower.

Byte 39 is the training frame count of the transmit burst. The count starts at 0 when the first training frame is sent in the transmit burst and increments by 1 for each successive training frame in the burst. In the example, the maximum this count can reach is 239, The counter can be made larger or smaller as needed. Alternatively, this counter can be a rollover counter. The counter is optional and helps the receiver determine the transmit burst boundary faster in noisy conditions instead uf relying on the training header. The counter value (incrementing) appears many times during a transmit burst while the training header only appears once.

Bytes 40 and 41 count the number of full transmit cycles that occur from the time that the master PHY enters the MASTER TRAINING state starting with a count of 1. Prior to this the count value remains at 0. The count value subsequently increments by 1 for every full transmit cycle. The counter can be made larger if the worst case training period needs to be longer.

Note that the master PHY does not start incrementing in the SLAVE TRAINING state 2314. The master PHY may be powered up long before the slave PHY is powered up and incrementing before the slave PHY is ready to train may cause the counter to roll over. The slave PHY cannot recover training frames initially so any information during this time will not be useful. The slave PHY mimics the count of the master PHY, This will let the master PHY know that the slave PHY has received the training frame from the master PHY correctly. Bytes 42 and 43 indicate the full transmit cycle to switch to normal operating mode.

Byte 44 indicates the number of units to delay the transmit burst from the slave PHY relative to the current delay. The master PHY has the information to compute the delay adjustment and sends delay adjustment data to the slave PHY. The slave PHY will mimic this value to let the master PHY know that it received the delay data correctly, Bytes 52 and 53 form the parity over bytes 38 to 51. The parity can be in the form of cyclic redundancy check (CRC) to detect corruption. Alternately, Reed Solomon parity (e.g. RS(16, 14) with 8 bit symbol) can be used to allow for detection and correction of errors.

Referring now to FIG. 33, a table shows how many 54 byte training frames are in each transmit burst.

As discussed above, $t_e$ is the time for round trip echo for a maximum length cable supported in the system. On the cable, the signal propagates forward $t_e/2$ and reflects back $t_e/2$. The total quiet period in a full transmit cycle is $2t_Q \geq t_e$.

Referring back to FIGS. 29 and 30, the two timing diagrams are shown from the perspective of each PHYs' transmitter output. However, the real intent is to separate the signals at the receivers of the master PHY and the slave PHY. Ideally, the quiet period between the echo and received signal should be spaced as far apart as possible. This section discusses an automatic way of spacing without knowing the length of the cable a-priori.

Figure 34:
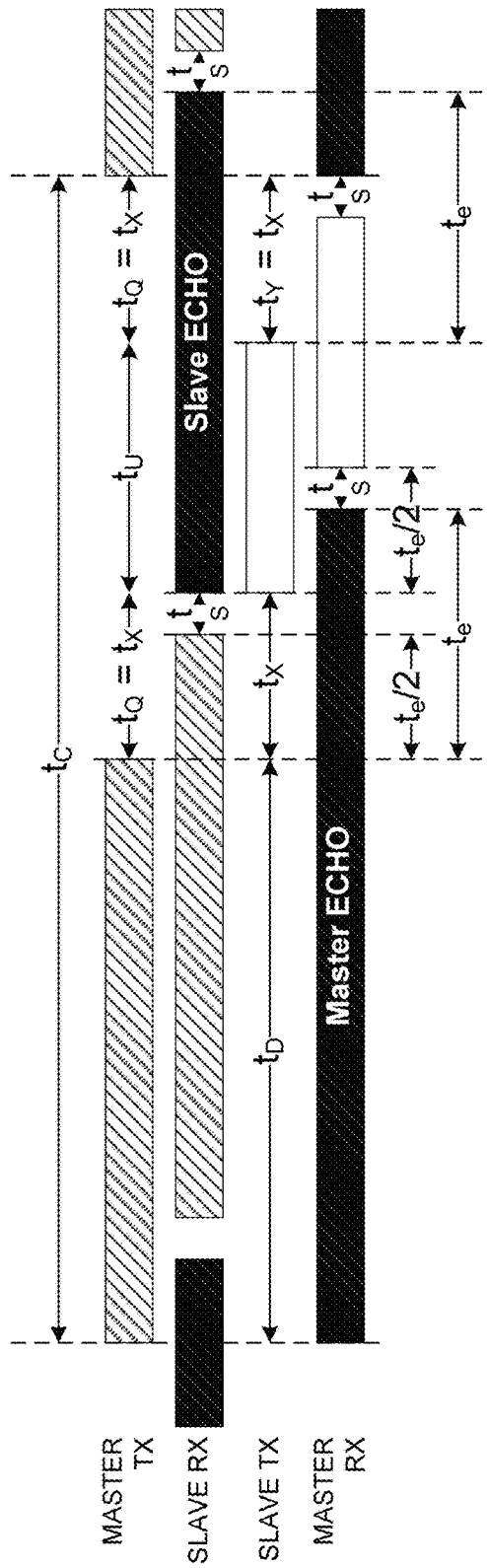
FIG. 34 is a timing diagram for asymmetric communication between a master PHY and a slave PHY assuming a maximum cable length according to the present disclosure.

Referring now to FIGS. 34-37, various timing diagrams are shown. In FIG. 34, a timing diagram of a maximum length cable that maximizes the quiet period between signal and echo is shown. Since the maximum length cable is known, the propagation delay of the echo $t_e$ is known. $t_Q$ is a given design parameter. Taking the case of the master operating as the downstream transmitter, the quiet period between the downstream burst is $t_Q+T_U+t_Q$. In order to optimize the quiet period $t_S$ between the signal and echo, the slave will have to initiate its transmit burst $t_S=t_Q-t_e/2$ after the end of the master's transmit burst as seen at the slave receiver. This will result in a quiet period of $t_S$ between signal and echo on both receivers. $t_e/2$ is the propagation delay hence $t_X=t_S+t_e/2=t_Q$.

Figure 35:
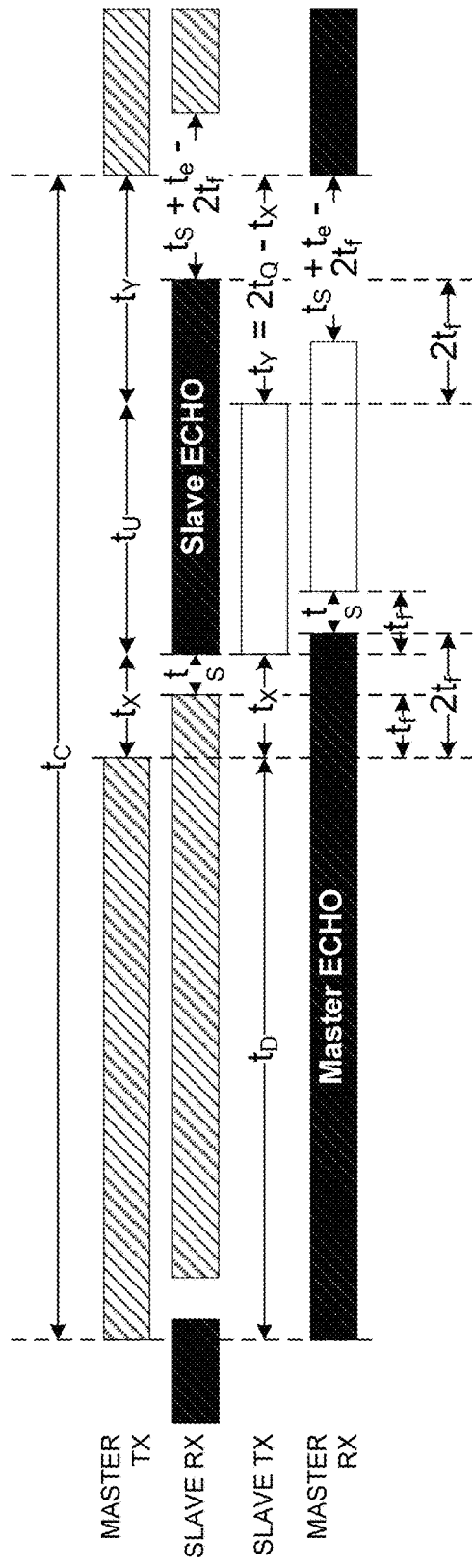
Figure 36:
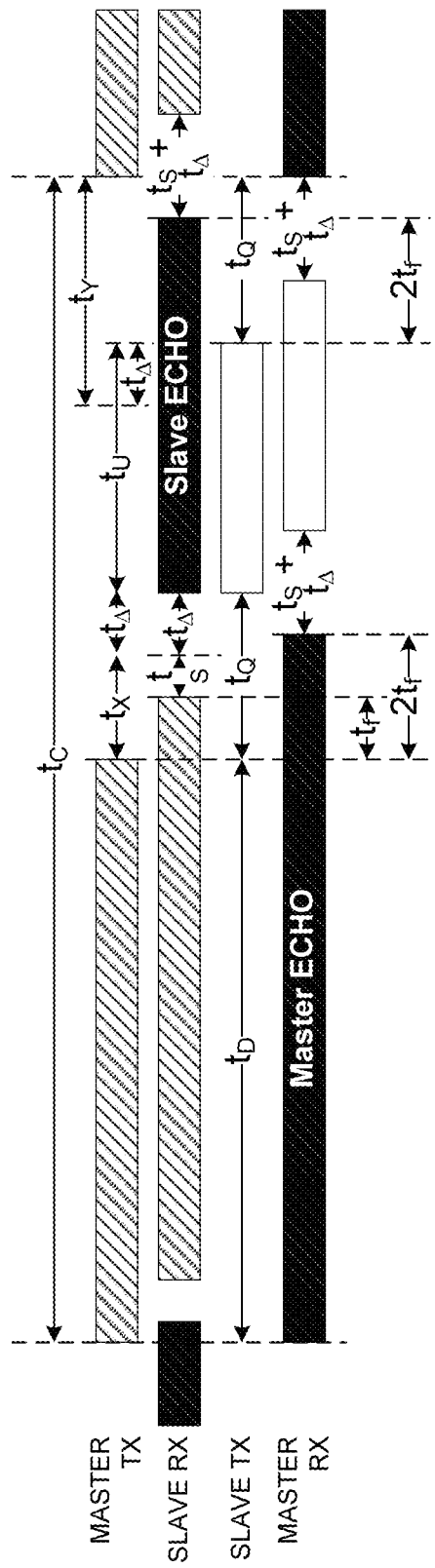

In FIGS. 35 and 36, timing diagrams are shown for a system operating with a cable that is shorter than the maximum length cable. Since the cable is shorter, the reflection is of a shorter duration. Let $t_f$ be the propagation delay from one PHY to another over the cable. Since the slave PHY does not know the cable length, the slave PHY initiates a transmit burst $t_S$ after the end of the transmit burst from the master PHY as in the maximum cable length case. This will result in a non-optimal result as one quiet period is $t_S$ while the other is $t_S+t_e-2t_f$. To provide an optimal result, each quiet period should be $t_S+t_e/2-t_f=t_Q-t_f=t_S+t_A$ where $t_A$ is the adjustment that has to be made.

Since the master PHY can measure a first delay period $t_M$ between the end of its transmit burst at its transmitter and the start of slave transmit burst at its receiver to be $t_M=t_S+2t_f$. Therefore, $t_A=t_Q-t_f-t_S$ and $t_f=(t_M-t_S)/2$ hence $t_A=t_Q-(t_M+t_S)/2$.

The adjustment period $t_A$ computed by the master can be sent to the slave via the quiet period adjustment parameter (byte 44) as discussed herein and the slave PHY makes the adjustment after the countdown is completed. The resulting timing diagram after the adjustment is shown in FIG. 35. Making the adjustment is not absolutely necessary since the master PHY and the slave PHY are designed to operate with maximum length cabling so at worst both the master PHY and the slave PHY will operate properly with unbalanced quiet periods.

Another variant of this scheme is to shorten the full transmit cycle for shorter cables. Instead of delaying the transmit burst of the slave PHY by $t_A$, the master PHY can reduce the full transmit cycle by $2t_A$. Even if no adjustments are made, the cable length and latency can be computed if to is known. Cable length=$(1-2t_A/t_e) \times$maximum cable length. One direction propagation delay is $t_f=t_e/2-t_A$.

Figure 37:
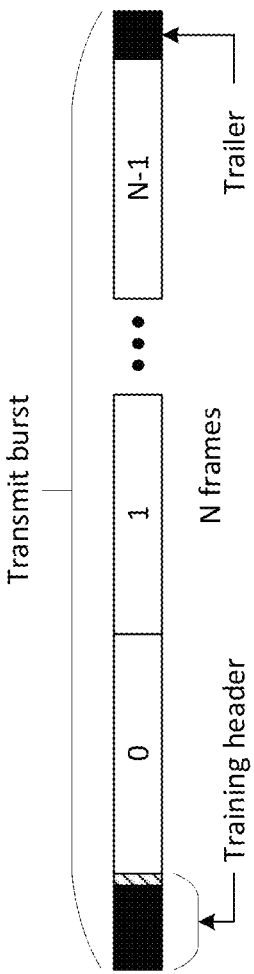
FIGS. 37 and 38 illustrates examples of frame formats of a transmit burst including a training header, frames and an optional trailer and a frequency adjustment according to the present disclosure.
Figures 38, 39:
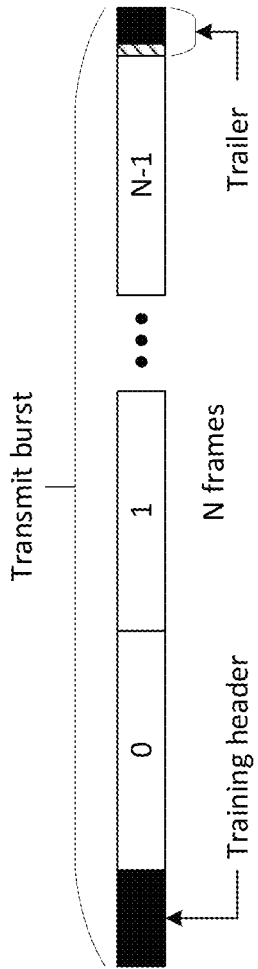
FIG. 39 is a table of an example of byte definitions for in-band frames according to the present disclosure.

Referring now to FIGS. 37 to 39, as discussed above, the transmit burst contains a training header, one or more data frames or training frames, followed by an optional trailer. During the training sequence, training frames are exchanged between the master PHY and the slave PHY to communicate PHY level control and status information with each other. Once the link becomes operational, data frames are sent instead of training frames. The payload in the data frames are determined by an upper level protocol. While it is possible to occasionally use one of the data frames to exchange PHY level control and status information, it is not desirable as this interferes with the upper level protocol.

Another method described further below sends in-band signaling between the master PHY and the slave PHY in a less intrusive manner. The in-band frame is a collection of B bytes. One byte (shaded in FIGS. 37 and 38) can be placed either at the end of the training header or at the end of the final frame during each full transmit cycle. It take B full transmit cycles to exchange the entire in-band frame. In the example below, B=16. The 16 bytes are protected by parity. For example, Reed Solomon coding such as Reed Solomon RS(16, 14) with 8 bit symbols can be used, Note that 16 bytes are chosen in the example to match the 16 bytes of the training frame described earlier so that some circuits can be reused.

In FIG. 39, a table showing examples of bytes of the in-band frames and their definitions is shown. Byte 0 bit 1 is used to exchange the local_PHY_ok and remote_PHY_OK as discussed above. Byte 1 can be used for leader/follower frequency compensation as discussed further below. There are other possible status parameters for functional safety that can be exchanged and are not shown in FIG. 39. Some of these parameters include abnormal temperature, abnormal voltage, high bit error rate, low SNR, and/or other information.

In order to determine alignment, a full transmit cycle counter can be used as discussed above. The full transmit cycle counter continues to increment after each full transmit cycle even after training is completed except it only needs to track cycle count mod B. Byte n of the in-band frame is inserted when cycle count mod B=n.

Note that there may be security issues exposing the in-band data. On way to address this concern is to encrypt the in-band frame. For example setting B=18 would allow the first 16 bytes to be encrypted with AES-128 (16 bytes to encrypted 16 bytes) and parity to be computed over the encrypted data.

The loop timing nature can keep all devices frequency locked to a central clock as discussed above in conjunction with FIG. 9. One weakness of this configuration with the camera side being the slave PHY is that the slave PHY has to maintain frequency lock when the master PHY is only transmitting for a much shorter duration (3% of the time in this example only).

It may be desirable to let the camera be the master PHY since it is sending data in the downstream direction (and occupying 95% of the bandwidth in this example). However, it is easier for the slave PHYs in the controller to maintain frequency lock in this configuration. However, the issue becomes how to frequency lock all the various clocks in the system. In some examples, a grand master clock shown in FIG. 40 is used.

Two methods are disclosed that use the grand master clock. In both methods, there is a leader PHY and a follower PHY. Note that the leader PHY can either be a master PHY or a slave PHY. The leader PHY will determine whether the system needs to speed up or slow down and communicate the necessary information to the follower PHY. This can be achieved by sending an in-band message as discussed above via a frequency compensation field. The leader PHY can set this value and the follower PHY mimics the value to acknowledge it.

Figure 40A:
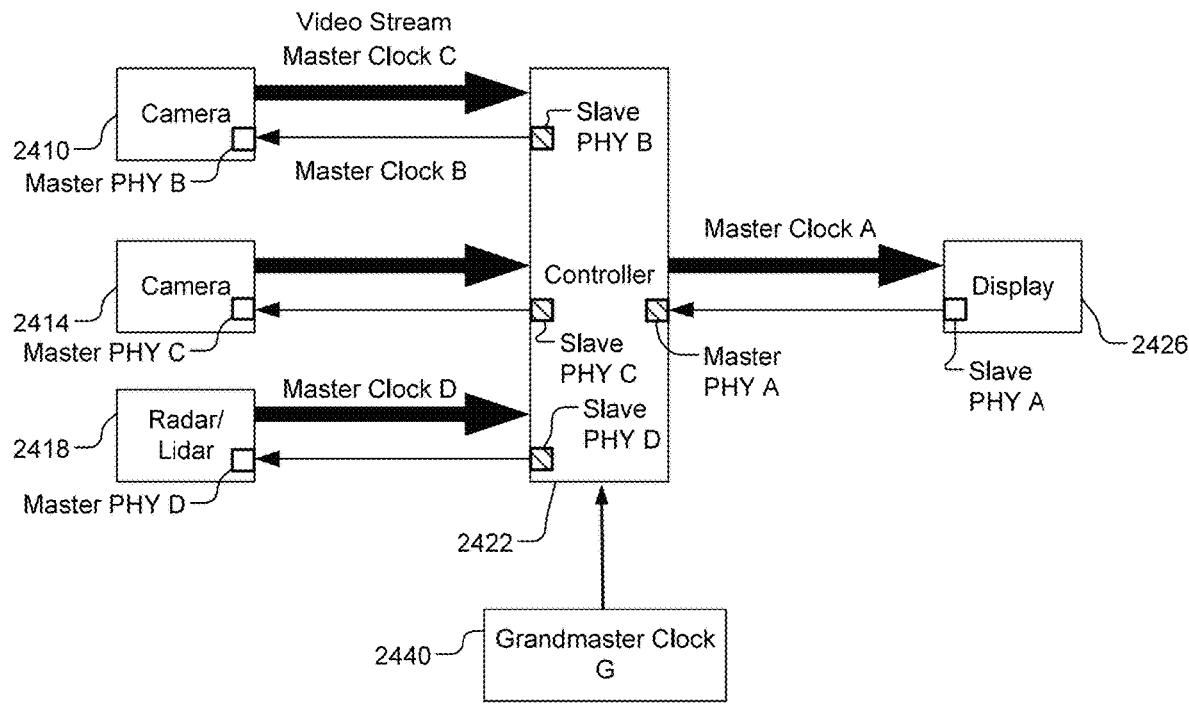
FIG. 40A is a functional block diagram of an example of a vehicle sensing system including one or more cameras and/or one or more sensors, a controller and a display and a grandmaster clock according to the present disclosure.
Figure 40B:
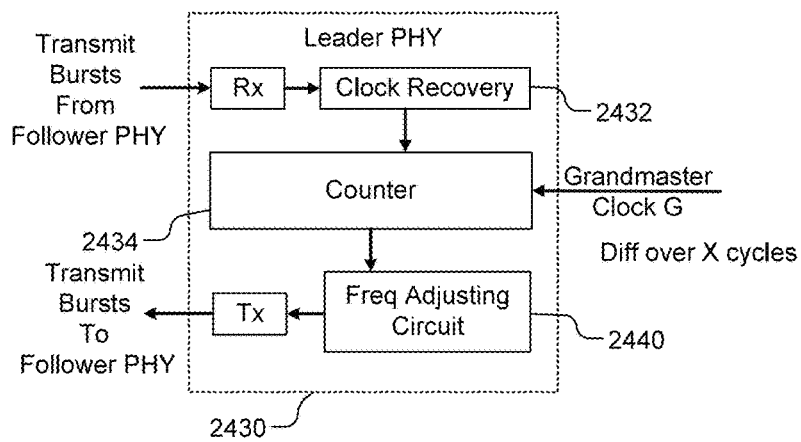
FIG. 40B is a functional block diagram of an example of a leader PHY including a frequency adjusting circuit according to the present disclosure.

Referring now to FIGS. 40A and 40B, an example of a vehicle sensing system for a vehicle such as an autonomous or non-autonomous vehicle is shown. The vehicle sensing system includes one or more cameras 2410 and 2414 and/or one or more sensors 2418 such as a radar sensor, an infrared sensor and/or a LIDAR sensor. Outputs of the cameras 2410 and 2414 and the sensor 2418 are transmitted to a controller 2422 at high speed. A display 2426 such as a touchscreen may receive video signals from the cameras 2410 and 2414 after processing by the controller 2422. The display 2426 also sends a control stream including control signals to the controller 2422. The control signals may adjust operation of the display, the cameras, the sensors or other vehicle functions or parameters. The controller 2422 sends a control stream including control signals back to the cameras 2410 and 2414 and/or the sensor 2418 at low speed.

The system includes a grandmaster clock G 2440 and master clocks A, B, C, D from master PHYs sourced by their respective local clocks. In FIG. 40A, the PHYs in the cameras 2410 and 2414 and the sensor 2418 correspond to master PHYs B, C, D and their link partners in the controller 2422 correspond to slave PHYs B, C, D. The PHY in the display 2426 corresponds to slave PHY A and its link partner in the controller 2422 corresponds to master PHY A.

Slave PHYs B, C, D and master PHY A (shaded in FIG. 40A) are leader PHYs while their link partners are follower PHYs (not shaded). In FIG. 40B, leader PHYs 2430 receives transmit bursts from follower PHYs. The leader PHYs 2430 include a clock recovery circuit 2432 to recover the clock from the received transmit burst. The leader PHYs 2430 include frequency calculation and adjustment circuits 2440 to calculate and send clock adjustment data to the follower PHYs.

Each of the leader PHYs 2430 compare the recovered link frequency with the frequency of the grandmaster clock. This comparison can be done by a counter 2434 counting clock cycle differences between the grandmaster clock G and one of the other clocks such as clock B over a predetermined number of grandmaster clock G cycles, There is an expected count value with the counter driven by clock B over this period if both clocks are frequency locked. A difference between the expected count minus the actual count is then accumulated. The result of the accumulation is the number of cycles to increase or decrease over G cycles for clock B to frequency lock with grandmaster clock G.

The leader PHYs (the slave PHYs B, C, D) send the frequency adjustment values to the link partner follower PHYs (master PHYs) to adjust their nominal frequencies using the in-band signaling as discussed above. For master PHY A, there is no need to transmit this information to slave A since the clock adjustment is made locally. At master PHYs A, B, C, D, a phase interpolator 2456 generates N phases of the local clock. To keep the clock B frequency locked to the local clock, the phase value will not change. To speed up clock B, the phase will decrease overtime, and to slow down clock B, the phase will increase over time. The phase Is continuous—that is phase N−1 wraps around to phase 0.

Figure 41:
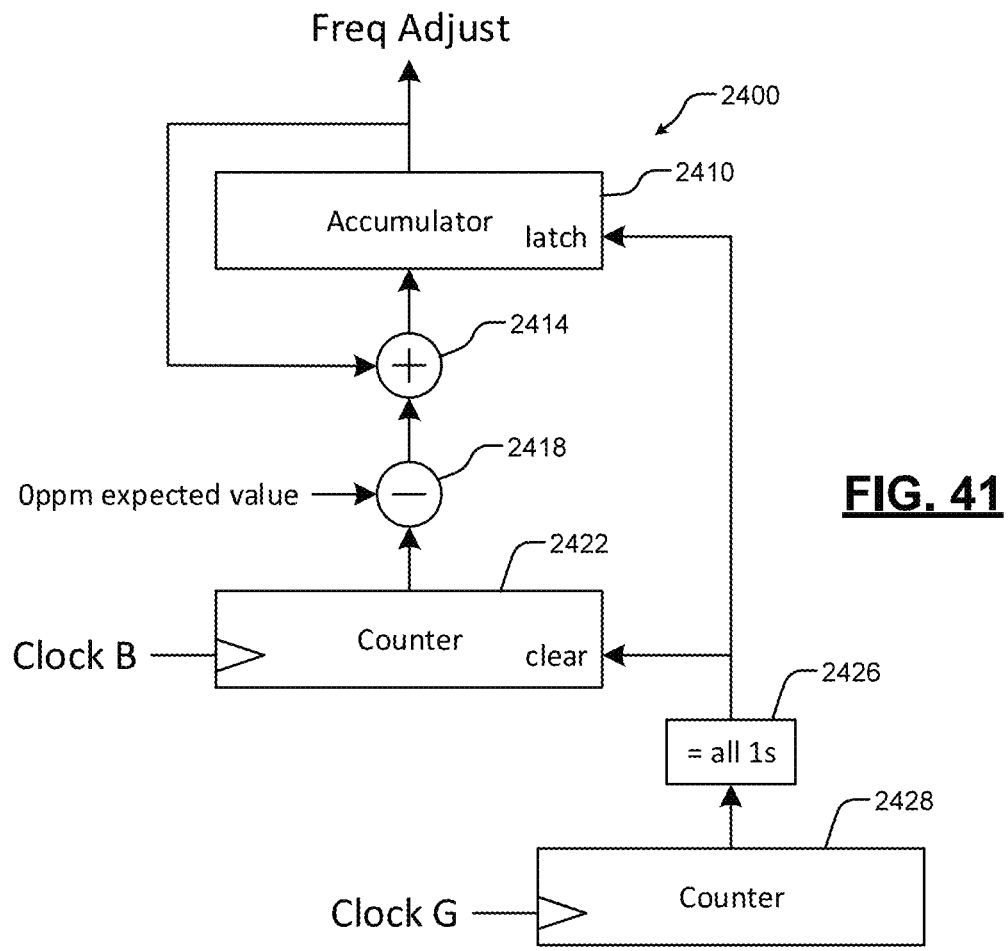
FIG. 41 is a functional block diagram of an example of a frequency adjustment calculation circuit to generate a frequency adjustment parameter according to the present disclosure.
Figure 42:
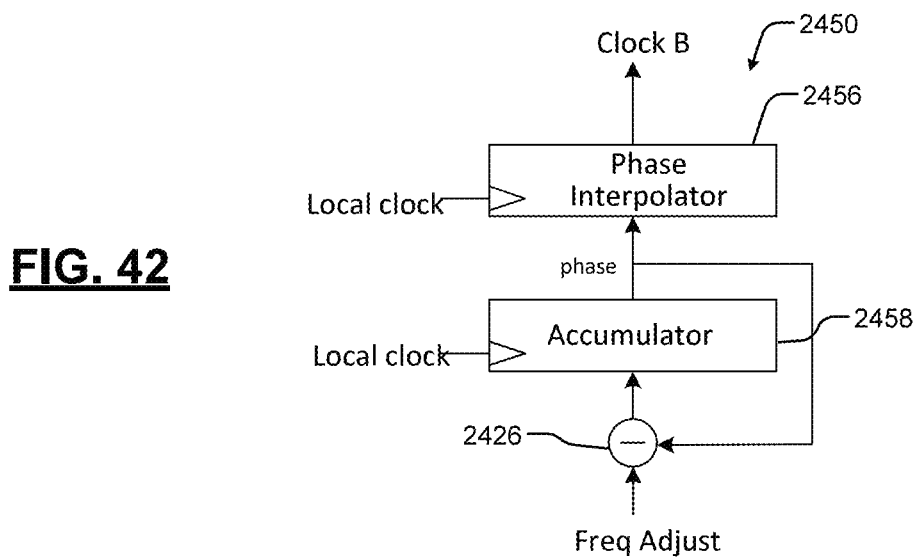
FIG. 42 is a functional block diagram of an example of a frequency adjustment circuit according to the present disclosure.

Referring now to FIGS. 41 and 42, a frequency calculation adjustment circuit 2400 includes a first counter 2428 to count a grandmaster clock. A second counter 2422 counts a second clock such as a clock of one of the follower PHYs. A difference circuit 2418 receives an expected value and an output of the first counter 2422. An output of the difference circuit 2418 is input to a summer 2414, Another input of the summer receives an output of an accumulator 2410. An output of the first counter 2428 is input to a clear input of the second counter 2422 and a latch input of the accumulator 2410.

In FIG. 42, a follower PHY acting as a master is shown. The adjustment value is output by the accumulator 2458, The most significant bits are output as the phase. The phase controls the phase interpolator 2456, which makes the clock B speed up or slow down. The more positive the adjustment value is, the faster the accumulator 2458 decreases. As a result, clock B runs faster. Similarly, the more negative the adjustment value is, the faster the accumulator 2458 increases. As a result, the clock B runs slower.

Note that on initial startup there may be a large difference between the frequencies. To prevent big phase jumps, the frequency can be gradually changed by limiting how fast the frequency adjustment value is changed. The follower PHY, instead of mimicking the adjustment value in the in-band signaling, can send the actual adjustment value that is currently being used. The best time to make large changes is during the FINALIZE state 2328 in FIG. 31 during initial training.

Since the frequency adjustment value is sent in-band repeatedly, it is tolerant to the occasional corruption of the in-band frame as the system will use the latest valid adjustment value if the current in-band frame is corrupted. Also note that once the frequency of the master clock settles close to the frequency of the grandmaster clock, the adjustment value will change very slowly over time.

The second method involves changing the quiet period or changing the duration of the header/trailer. Instead of using the adjustment value to increase or decrease the clock frequency, the value is used to increase or decrease either the quiet period or the duration of the header/trailer. This has the effect of increasing or decreasing the number of clock cycles for a given amount of data.

The leader PHY and follower PHY coordinate the time when the increase or decrease occurs. This time can be something as simple as during the quiet period immediately after when the final byte in-band frame is received.

Figures 43, 44:
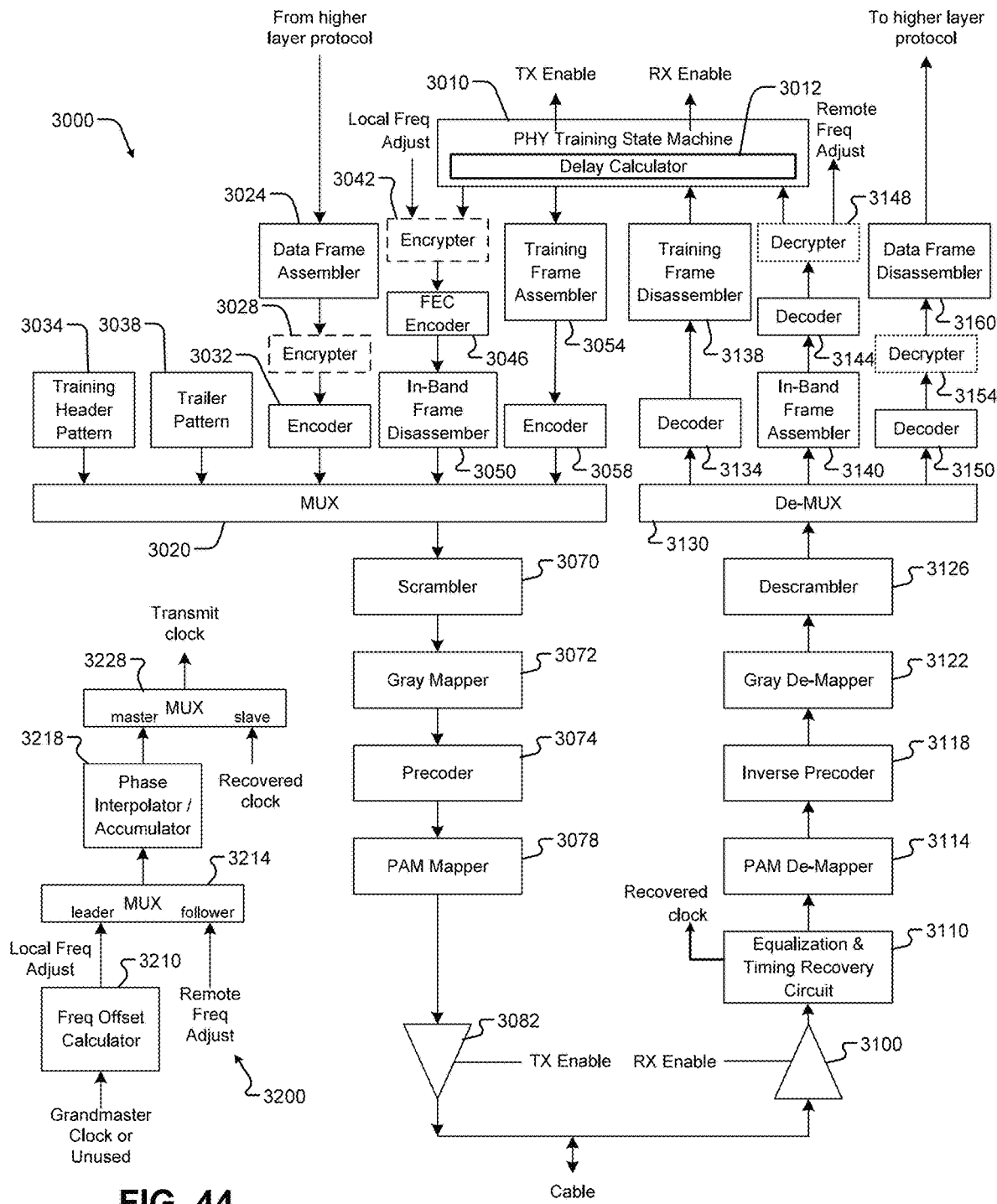
FIG. 43 is a functional block diagram of a PHY according to the present disclosure.
FIG. 44 is a functional block diagram of a frequency adjustment circuit according to the present disclosure.

Referring now to FIG. 43, an example of a PHY device 3000 is shown. The PHY device 3000 includes a PHY training state machine 3010. In some examples, the PHY training state machine 3010 includes an optimum delay calculator 3012.

Data from a higher level protocol is received by a data frame assembler 3024. An output of the data frame assembler 3024 is optionally encrypted by an encrypting device 3028 and further encoded by a forward error correction (FEC) encoder 3032. An output of the FEC encoder 3032 is input to a multiplexer 3020. In addition, a training header pattern 3034 and a training pattern 3038 are also output to the multiplexer 3020.

Local frequency adjustment data is calculated and optionally encrypted by an encrypting device 3042, encoded by an FEC encoder 3046. An output of the FEC encoder 3046 is input to an in-band frame disassembler 3050. An output of the in-band frame disassembler 3050 is output to the multiplexer 3020. An output of the PHY training state machine 3010 is input to a training frame assembler 3054. An output of the training frame assembler 3054 is input to an FEC encoder 3058.

An output of the multiplexer 3020 is input to a scrambler 3070, which scrambles the data. An output of the scrambler 3070 is input to a Gray mapping device 3072. An output of the Gray mapping device 3072 is input to a pre-coder 3074. An output of the pre-coder 3074 is input to a pulse amplitude modulation (PAM) mapper 3078. An output of the PAM mapper 3078 is input to a transmitter 3082, which transmits data onto the cable medium.

A receiver 3100 receives data on the cable medium and outputs the data through an equalization and timing recovery circuit 3110, An output of the equalization and timing recovery circuit 3110 is input to a PAM de-mapper 3114. An output of the de-mapper 3114 is input to an inverse pre-coder 3118. An output of the inverse pre-coder 3118 is input to a Gray de-mapper 3122. An output of the Gray de-mapper 3122 is input to a descrambler 3126 having an output connected to an Input of the demultiplexer 3130.

An output of the demultiplexer 3130 is input to an FEC decoder 3134 and having an output connected to a training frame disassembler 3138. An output of the training frame disassembler 3138 is input to the PHY training state machine 3010, Another output of the demultiplexer 3130 is input to an in-band frame assembler 3140. An output of the in-band frame assembler 3140 is input to an FEC decoder 3144 performing FEC decoding. An output of the FEC decoder 3144 is input to an optional decrypting device 3148. First output of the optional decrypting device 3148 is input to the training state machine 3010.

Another output of the demultiplexer 3130 is input to an FEC decoder 3150 performing FEC decoding. An output of the FEC decoder 3150 is input to an optional decrypting device 3154. An output of the optional decrypting device 3154 is input to a data frame disassembly device 3160 having an output that communicates with a higher layer protocol.

Referring now to FIG. 44, a circuit 3200 for generating a transmit clock Is shown. A frequency offset calculator 3210 outputs a local frequency adjustment to a multiplexer 3214. The frequency offset calculator 3210 may also receive a grandmaster clock. A remote frequency adjustment is input to another input of the multiplexer 3214. An output of the multiplexer 3214 is input to a phase interpolator/accumulator 3218. An output of the phase interpolator/accumulator 3218 is input to a master input of the multiplexer 3228. A slave input of the multiplexer 3228 receives a recovered clock. An output of the multiplexer 3228 is a transmit clock.

In the transmit path, the header and trailer pattern are usually fixed patterns. The data frame assembly device 3024 takes data from a higher layer protocol and converts it to a fixed size data frame. This data can optionally be encrypted by the encrypting device 3024 and FEC parity symbols are appended by the encoder 3032. The training frame assembly device 3054 similarly assembles the frame similar to the discussion above with the FEC parity symbols appended.

The in-band data can optionally be encrypted by the encrypting device 3042 followed with FEC parity symbols being appended by the encoder 3046. The resulting in-band data is then disassembled one byte at a time and placed after the header or before the trailer as discussed above.

The multiplexer 3020 selects from header, trailer, data frame, training frame, or in-band data. The output of the multiplexer 3020 is scrambled by the scrambler 3070 to even out the spectrum of the transmitted waveform. If the transmitted waveform is a multi-level signal, it may go through gray mapping by the gray mapper 3072 and pre-coding by the pre-coder 3074 to minimize error propagation. For example if the output is 4 levels transmitting at $-1$, $-\frac{1}{3}$, $\frac{1}{3}$, and 1 the gray mapping instead of mapping the 2 bit as 00→$-1$, 01→$-\frac{1}{3}$, 10→$\frac{1}{3}$, and 11→1 it would instead map it as 00→$-1$, 01→$-\frac{1}{3}$, 11→$\frac{1}{3}$, and 10→1. This reduces the number of bits being in error when a level is mistaken as the one in an adjacent level. (i.e. $-\frac{1}{3}$ being mistaken for $\frac{1}{3}$ will result in one bit being mismatched instead of two bits.). The mapping of the gray mapper would be 00→0, 01→1, 11→2, and 10→3 and the PAM mapping of 0→$-1$, 1→$-\frac{1}{3}$, 2→$\frac{1}{3}$, and 3→1.

The pre-coder 3074 prevents error propagation at the receiver. For PAM4, the pre-coder 3074 is usually in the form of $(1+D) \bmod 4$, $(1-D) \bmod 4$, or $(1-D^2) \bmod 4$, where 1 represents the current value to be output and $D^n$ represent the actual output n samples ago.

Note that PAM 2 does not require gray coding or precoding.

In the receive path, the received waveform is equalized and sampled by the equalization and timing recovery circuit 3110 at an optimal point from the timing recovery. The transmit process is reversed with PAM de-mapping and the PAM de-mapping device 3114, followed by inverse precoding in the inverse pre-coding device 3118, gray de-mapping in the gray the mapping device 3122, and descrambling in the descrambler 3126. The demultiplexer 3130 separates out the data frame, training frame, and in-band data. In the data frame, errors are corrected with by the FEC decoder 3150 followed by optional decrypting in the decrypting device 3154, and finally disassembled by the data frame disassembly device 3160 to the higher layer protocol. The training frame similarly goes through the FEC decoding in the FEC decoder and disassembly in the training frame disassembler 3138, The individual bytes of the in-band data is assembled by the N-band frame assembler 3140, corrected with the FEC in the FEC decoder 3144 followed by optional decrypting and the decrypting device 3148.

Data in the training frames and the in-band data interacts with the PHY training state machine 3010 and allows for the computation of the optimal delays between transmit bursts. The receive path runs synchronous to the recovered clock. The transmit path runs synchronous to the recovered clock if the PHY is a slave (loop timing).

If the PHY is a master, absent of any adjustment for frequency compensation as discussed above, the transmit path will run synchronous to the PHYs local clock. If frequency compensation is required it will adjust this clock based on the remote frequency adjustment if the PHY is a follower. Otherwise, if the PHY is a leader, it will use its locally computed offset based on the difference between the local clock and the grandmaster clock.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed," Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A first physical layer device, comprising:
   a first transmitter transmitting first data to a second physical layer device over a medium at a first line rate during a first transmit period; and
   a first receiver configured to:
     not receive data during the first transmit period and an echo reflection period occurring after the first transmit period,
     wherein the echo reflection period is based on a length of the medium between the first physical layer device and the second physical layer device;
     after the echo reflection period, receive second data from the second physical layer device over the medium at a second line rate that is less than the first line rate; and
   an encoder to perform forward error correction on the first data.

2. The first physical layer device of claim 1, wherein the first transmitter transmits N bits per symbol and wherein the first receiver receives M bits per symbol, wherein N is greater than or equal to M.

3. The first physical layer device of claim 2, wherein N is greater than 1 and M is equal to 1.

4. The first physical layer device of claim 2, wherein the first transmitter uses pulse amplitude modulation (PAM) 4 and the first receiver uses PAM 2.

5. The first physical layer device of claim 1, further comprising a first-in-first-out (FIFO) buffer to receive the first data and to output the first data to the encoder.

6. The first physical layer device of claim 1, wherein the medium is selected from a group consisting of a single pair of wires, an unshielded twisted pair cable, a shielded twisted pair cable, and a coaxial cable.

7. The first physical layer device of claim 1, wherein the first data, the second data and power are transmitted on the medium.

8. A link segment comprising:
   the first physical layer device of claim 1; and
   the second physical layer device,
   wherein the second physical layer device is connected to the medium and located remote from the first physical layer device, wherein the second physical layer device comprises:
     a second receiver receiving the first data at the first line rate during the first transmit period; and
     a second transmitter configured to:
       not transmit data during the first transmit period and during a first period, equal to one-half of the echo reflection period, after the first transmit period; and
       after the first period, to receive and transmit the second data on the medium at the second line rate.

9. The link segment of claim 8, further comprising a clock recovery circuit to generate a recovered clock signal based on the first data from the first transmitter and to output the recovered clock signal to the second transmitter.

10. The link segment of claim 8, wherein the second physical layer device operates as a master and the first physical layer device operates as a slave.

11. The link segment of claim 8, wherein the first physical layer device operates as a master and the second physical layer device operates as a slave.

12. A first physical layer device, comprising:
   a first transmitter transmitting first data to a second physical layer device over a medium at a first line rate during a first transmit period; and
   a first receiver configured to:
     not receive data during the first transmit period and an echo reflection period occurring after the first transmit period,
     wherein the echo reflection period is based on a length of the medium between the first physical layer device and the second physical layer device;
     after the echo reflection period, receive second data from the second physical layer device over the medium at a second line rate that is less than the first line rate; and
   a Reed Solomon encoder to perform forward error correction on the first data.

13. The first physical layer device of claim 12, wherein the first transmitter transmits N bits per symbol and wherein the first receiver receives M bits per symbol, wherein N is greater than or equal to M.

14. The first physical layer device of claim 12, further comprising a first-in-first-out (FIFO) buffer to receive the first data and to output the first data to the Reed Solomon encoder.

15. The first physical layer device of claim 12, wherein the medium is selected from a group consisting of a single pair of wires, an unshielded twisted pair cable, a shielded twisted pair cable, and a coaxial cable.

16. The first physical layer device of claim 12, wherein the first data, the second data and power are transmitted on the medium.

17. A link segment comprising:
the first physical layer device of claim 12; and
the second physical layer device,
wherein the second physical layer device is connected to the medium and located remote from the first physical layer device, wherein the second physical layer device comprises:
a second receiver receiving the first data at the first line rate during the first transmit period; and
a second transmitter configured to:
not transmit data during the first transmit period and during a first period, equal to one-half of the echo reflection period, after the first transmit period; and
after the first period, to receive and transmit the second data on the medium at the second line rate.

18. The link segment of claim 17, further comprising a clock recovery circuit to generate a recovered clock signal based on the first data from the first transmitter and to output the recovered clock signal to the second transmitter.

19. The link segment of claim 17, wherein the second physical layer device operates as a master and the first physical layer device operates as a slave.

20. The link segment of claim 17, wherein the first physical layer device operates as a master and the second physical layer device operates as a slave.

* * * * *